US007873692B2

(12) United States Patent
Yamada et al.

(10) Patent No.: US 7,873,692 B2
(45) Date of Patent: Jan. 18, 2011

(54) INSTRUMENTATION AND CONTROL INFORMATION PROVIDING METHOD, INSTRUMENTATION AND CONTROL INFORMATION PROVIDING SYSTEM, INSTRUMENTATION AND CONTROL INFORMATION PROVIDING SERVER, AND INSTRUMENTATION AND CONTROL EQUIPMENT

(75) Inventors: Takaaki Yamada, Okayama (JP); Ikuo Nanno, Okayama (JP); Kosaku Ando, Okayami (JP); Hitoshi Tanaka, Okayama (JP); Hiroyuki Togawa, Okayama (JP)

(73) Assignee: Omron Corporation, Kyoto (JP)

( * ) Notice: Subject to any disclaimer, the term of this patent is extended or adjusted under 35 U.S.C. 154(b) by 1897 days.

(21) Appl. No.: 10/738,988

(22) Filed: Dec. 19, 2003

(65) Prior Publication Data

US 2004/0186664 A1 Sep. 23, 2004

(30) Foreign Application Priority Data

Dec. 20, 2002 (JP) ............................ P2002-371063

(51) Int. Cl.
*G06F 15/16* (2006.01)
(52) U.S. Cl. ..................................... 709/203
(58) Field of Classification Search .................. 709/224, 709/201, 203
See application file for complete search history.

(56) References Cited

U.S. PATENT DOCUMENTS

| 5,892,690 | A | 4/1999 | Boatman et al. |
| 6,445,962 | B1* | 9/2002 | Blevins et al. ................. 700/37 |
| 2003/0023336 | A1* | 1/2003 | Kreidler et al. ............. 700/108 |
| 2004/0035851 | A1* | 2/2004 | Antoniou et al. ............ 219/509 |

FOREIGN PATENT DOCUMENTS

| EP | 1 102 185 A2 | 5/2001 |
| FR | 2 814 260 | 3/2002 |
| JP | 2002-091552 | 3/2002 |
| JP | 2002-268754 A | 9/2002 |
| WO | WO 01/61665 A2 | 8/2001 |
| WO | WO 03/007090 A2 | 1/2003 |

OTHER PUBLICATIONS

Honda et al., "Hakuto/Yokogawa Automatic Corrosion Control System," vol. 45, No. 1, 2001, pp. 23-26.

* cited by examiner

*Primary Examiner*—Benjamin R Bruckart
*Assistant Examiner*—Noel Beharry
(74) *Attorney, Agent, or Firm*—Foley & Lardner LLP

(57) ABSTRACT

A customer submits a service application by accessing the home page of a service provider through a personal computer 3, and transmits the data including the operation amount and the control amount of a temperature controller 4 to a server 2 of the service provider. The server 2 accumulates the received data, and in accordance with the contents of the received service application, processes the accumulated data and provides the services of calculating the control parameter for the temperature controller 4, producing a model of the object of control and making a diagnosis by checking for a temperature control fault.

6 Claims, 24 Drawing Sheets

Fig. 4A

Select data

Device ID, 012
ch No. 1
Period 2002 y 11 m 29 d 21 : 11
to
2002 y ☐ m ☐ d ☐ : ☐

Return  OK  Add period

Fig. 4B

Sampling interval 1 s
Accumulated data items

☑ Temp
☐ Set temp
☑ Operating amount
☐ P I D

Return  OK

Fig. 16A

Normal   Select data

Device ID  012
ch No.  1
Period  2002 y 11 m 29 d 21 : 11
        to
        2002 y ☐ m ☐ d ☐ : ☐

Return  OK

Fig. 16B

Diagnosis  Select data

Device ID  012
ch No.  1
Period  2002 y 11 m 29 d 21 : 11
        to
        2002 y ☐ m ☐ d ☐ : ☐

Return  OK  Add period

INSTRUMENTATION AND CONTROL INFORMATION PROVIDING METHOD, INSTRUMENTATION AND CONTROL INFORMATION PROVIDING SYSTEM, INSTRUMENTATION AND CONTROL INFORMATION PROVIDING SERVER, AND INSTRUMENTATION AND CONTROL EQUIPMENT

CROSS-REFERENCE TO RELATED PATENT APPLICATIONS

Japan Priority Application P2002-371063, filed Dec. 20, 2002 including the specification, drawings, claims and abstract, is incorporated herein by reference in its entirety.

BACKGROUND OF THE INVENTION

1. Field of the Invention

The present invention relates to a technique suitably used in the fields of instrumentation and control of various physical quantities such as temperature, pressure, flow rate and rotational speed, or in particular to a technique for providing useful information on instrumentation and control to clients engaged in instrumentation and control of physical quantities.

2. Description of the Related Art

In the conventional temperature control technique by measuring and controlling an object to a predetermined temperature, as proposed in Japanese Unexamined Patent Publication No. 2002-268754, for example, the operation history of a sensor is recorded to make it easy to trace the cause of a malfunction which may occur.

To determine a malfunction and the time of occurrence and trace the cause of the malfunction, however, the detection temperature (control amount) of a temperature sensor alone is not sufficient, and the data such as the amount of operation of a temperature controller or the like is required to be accumulated. The problem, however, is that the data such as the operation amount of the temperature controller and the temperature detected by the temperature sensor cannot be easily accumulated by the client, in view of the need of constructing a system using a data logger and an instrumentation software.

In controlling the temperature by the temperature controller, for example, the control parameter such as the PID gain is required to be set by the client using the auto-tuning function or the like incorporated in the temperature controller. Thus, the control parameter cannot necessarily be set in satisfactory manner, and a means is desired by which the proper control parameter can be acquired more easily.

As long as the client can produce a model of an object to be controlled, for example, it is possible to carry out various simulations using the particular model for determining the optimum parameter. The modeling of an object to be controlled, however, requires a special tool and therefore cannot be easily carried out. Therefore, it is desired to easily acquire a model of an object to be controlled.

SUMMARY OF THE INVENTION

This invention has been achieved in view of the points described above, and the object thereof is to permit the client measuring and controlling the physical quantities such as the temperature to easily acquire information useful for instrumentation and control.

In order to achieve the object described above, according to one aspect of the invention, there is provided an instrumentation and control information providing method for providing information on instrumentation and control, comprising the transmission step for the client to transmit to a server through a network the instrumentation and control data obtained by measuring and controlling an object of instrumentation and control, the processing step for the server to process the received instrumentation and control data in accordance with the request of the client, and the providing step for the server to the server to provide to the client through the network the information processed in the processing step.

The term "network" is defined as an internet, WAN or LAN interconnecting computers.

Also, the term "instrumentation and control" indicates at least one of the measurement and control of various physical quantities such as temperature, pressure, flow rate and rotational speed.

The term "instrumentation and control equipment" is defined as a device or equipment for measuring and/or controlling the various physical quantities including temperature, pressure, flow rate and rotational speed, and includes various regulators including instrumentation equipment such as a digital panel meter for measuring various physical quantities such as temperature, pressure, flow rate and rotational speed and a temperature controller for controlling the temperature.

The term "object of instrumentation and control" is defined as at least one of an object of which various physical quantities such as temperature, pressure, flow rate and rotational speed are measured and an object of which the physical quantities described above are controlled.

The term "instrumentation and control data" is defined as the data obtained by measuring and controlling an object of instrumentation, including the measurement data obtained by measuring an object of measurement, an output (operation amount) data for an object of control and a control amount data obtained by measuring an object of control.

Together with the instrumentation and control data, the data related to the instrumentation and control, such as a target value and an alarm value, may be transmitted. Also, the instrumentation and control data obtained while measuring and controlling an object of instrumentation and control by an instrumentation and control equipment are preferably transmitted.

The "processing of the instrumentation and control data" includes the process of accumulating the instrumentation and control data and at the request of the client, reading, analyzing and treating the instrumentation and control data.

According to this invention, a client representing the customer receiving a service transmits the instrumentation and control data obtained by instrumentation and control to a server representing a service provider. The server processes the received instrumentation and control data in accordance with the request of the client, and provides the information processed to the client. Thus, the customer can be provided with the required instrumentation and control data and the instrumentation and control data analyzed and processed by requesting the service provider without the need of accumulating or analyzing the instruction and control data.

According to another aspect of the invention, there is provided an instrumentation and control information providing method for providing information related to the instrumentation and control, comprising the application step for the client to submit an application to a server for a service, the transmission step for the client to transmit to the server through a network the instrumentation and control data obtained by measuring and controlling an object of instrumentation and control by an instrumentation and control equipment, the application receiving step for the server to receive the application from the client for the service, the data accumulation step for the server to receive and accumulate the instrumentation and control data, the processing step for the server to process the accumulated instrumentation and control data in accordance with the received service application, and the providing step for the server to provide the information processed in the processing step to the client through the network.

In this aspect of the invention, the client representing the customer for receiving a service submits an application to receive the service and transmits the instrumentation and control data obtained by instrumentation and control to the server representing the service provider. The server accumulates the particular instrumentation and control data, and in accordance with the contents of the received service application, processes the accumulated instrumentation and control data. Then, the server provides the processed information to the client. Therefore, the customer can be provided with the information in accordance with the service application without the need of accumulating the instrumentation and control data.

According to still another aspect of the invention, there is provided an instrumentation and control information providing method for providing information related to instrumentation and control, comprising the receiving step for the server to receive from the client through a network the instrumentation and control data obtained by measuring and controlling an object of instrumentation and control by the instrumentation and control equipment, the processing step for the server to process the instrumentation and control data in accordance with the request of the client, and the providing step for the server to provide the client, through the network, with the information processed in the processing step.

In this aspect of the invention, the server representing the service provider receives the instrumentation and control data from the client representing the customer, processes the instrumentation and control data in accordance with the request of the client and provides the client with the information processed. Therefore, the customer is not required to accumulate or analyze the instrumentation and control data, and by requesting the server, can receive the information including the required instrumentation and control data required and the instrumentation and control data analyzed and processed without the need of accumulating and analyzing the instrumentation and control data.

According to yet another aspect of the invention, there is provided an instrumentation and control information providing method for providing information related to the instrumentation and control, comprising the application receiving step for the server to receive an application for a service from the client, the data accumulation step for the server to receive through the network and accumulate the instrumentation and control data obtained from the client by measuring and controlling an object of instrumentation and object by the instrumentation and control equipment, the processing step for the server to process the accumulated instrumentation and control data in accordance with the received service application, and the providing step for the server to provide the information processed in the processing step to the client through the network.

In this aspect of the invention, the server receives and accumulates the instrumentation and control data from the client representing the customer, and in accordance with the contents of the received service application, processes the accumulated instrumentation and control data and provides the processed information to the client. Therefore, the customer is not required to accumulate the instrumentation and control data and can be provided with the information corresponding to the service application submitted.

According to an embodiment of the invention, the instrumentation and control equipment is a temperature controller, the instrumentation and control data contains at least the data on the operation amount and the control amount, the contents of the service provided by the server include at least one of the data accumulation service for accumulating the instrumentation and control data and providing the accumulated data in accordance with the request, the tuning service for providing the control parameter for the temperature controller, the modeling service for modeling and providing a model of the object of instrumentation and control and the diagnosis service for diagnosing the temperature controller for a temperature control fault.

In this embodiment of the invention, the client representing the customer receiving the service transmits at least the data on the operation amount and the control amount of the temperature controller to the server representing the service provider. The server accumulates the data, and in accordance with the service request from the client, processes the accumulated data such as the operation amount and the control amount. The processed information, which are the data such as the operation amount and the control amount for the period required by the customer in the case of the data accumulation service, the control parameter of the temperature controller in the case of the tuning service, the model of the object of control in the case of the modeling service or the information on a fault or the like in the case of the diagnosis service, are transmitted to the client. Therefore, the customer can be provided with the information corresponding to the service involved.

According to a preferred embodiment of the invention, the processing is executed in the processing step in accordance with the contents of at least one of the data accumulation service, the tuning service, the modeling service and the diagnosis service. In the data accumulation service, the corresponding data are read from the accumulated data in accordance with the request of the client. In the tuning service, the control parameter is calculated using the model of an object of instrumentation and control based on the accumulated data of the operation amount and the control amount. In the modeling service, the object of instrumentation and control is modeled based on the accumulated data of the operation amount and the control amount. In the diagnosis service, the diagnosis process is executed to check for a fault based on the data of the operation amount and the control amount accumulated for a normal period and a diagnosis period.

In this invention, the server representing the service provider provides services corresponding to the contents of the service application. Thus, in the data accumulation service, the server reads the corresponding data from the accumulated data. In the tuning service, the server calculates the control parameter based on the accumulated data of the operation amount and the control amount. In the modeling service, the server executes the modeling process based on the accumulated data of the operation amount and the control amount. In the diagnosis service, the server makes a diagnosis to check for a fault based on the data of the operation amount and the control amount accumulated for a normal period and a diagnosis period. As a result, the customer, who transmits the data of the operation amount and the control amount and applies for a service, can be provided with various information in accordance with the service applied for.

According to another embodiment of the invention, at least one of the steps executed by at least one of the server and the client includes the step of urging one of the service providing party and the service receiving party to input the required information, and based on the required information thus input, at least one of the steps described above is executed.

The "service providing party" is defined as, for example, a person in charge associated with the service provider who provides the data accumulation service, the tuning service, the modeling service or the diagnosis service. The "service receiving party", on the other hand, is defined as a person in charge associated with the user or the customer, for example, who receives the service.

The "required information" is defined as information required for executing each step or the information required for the party who receives a sophisticated service or a special service.

According to this invention, the information required for executing each step or the information required for providing a sophisticated service or a special service are input on the part of the client or the server, and based on this input, each step can be executed or a sophisticated service or a special service, as the case may be, can be provided.

According to still another embodiment of the invention, the processing step includes the step in which the server urges the service providing party to input the required information. Thus, the server executes the process corresponding to the service application by adding the input required information.

The required information includes the information required for processing the data accumulation service, the tuning service, the modeling service or the diagnosis service in the processing step, or the input required for a sophisticated or a special service such as a service that cannot be accomplished only by the programmed automatic processing, including the provision of a sophisticated control parameter, the provision of the result of a sophisticated diagnosis or an identification of the cause of a malfunction, such as the input required for correcting the control parameter or the input required for processing according to a special program.

According to this invention, the person in charge associated with the service providing party inputs data for correcting the control parameter, for example, based on his experiences and knowledge, and thereby can provide a highly accurate control parameter which cannot be accomplished only by the programmed automatic processing.

According to yet another aspect of the invention, there is provided an instrumentation and control information providing system comprising a server connected to a network for providing a service related to the instrumentation and control, and a client connected to the network, wherein the client transmits to the server through the network the instrumentation and control data obtained by measuring and controlling an object of instrumentation and control by the instrumental and control equipment, and receives from the server the information provided through the network, while the server receives the instrumentation and control data, and in response to the request of the client, processes the instrumentation and control data and supplies the client with the processed information through the network.

According to this invention, the client representing the customer receiving the service transmits to the server representing the service provider the instrumentation and control data obtained by the instrumentation and control. The server receives the instrumentation and control data, and in response to the request of the client, processes the instrumentation and control data and provides the processed information to the client. Therefore, the customer is not required to accumulate or analyze the instrumentation and control data, and thus by requesting the service provider, can receive the required instrumentation and control data or the information containing the instrumentation and control data analyzed and processed appropriately.

According to a further aspect of the invention, there is provided an instrumentation and control providing system comprising a server connected to a network for providing a service related to the instrumentation and control, and a client connected to the network, wherein the client is equipped with a communication means for transmitting to the server through the network the instrumentation and control data obtained by measuring and controlling an object of instrumentation and control by the instrumental and control equipment, and receiving from the server the information provided through the network, and an application means for browsing the contents of the service and submitting an application for the service, and wherein the server is equipped with a data accumulation means for accumulating the instrumentation and control data, an application receiving means for receiving a service application from the client, a processing means for reading the instrumentation and control data accumulated in the data accumulation means and executing the process corresponding to the service application received, and a communication means for receiving the instrumentation and control data from the client through the network and transmitting the information processed in the processing means to the client through the network.

In this aspect of the invention, the client representing the customer receiving the service browses the contents of the service to be provided and submits a service application, and when the client transmits the instrumentation and control data obtained by instrumentation and control to the server representing the service provider, the server accumulates the particular instrumentation and control data, and in accordance with the contents of the service application received, processes the accumulated instrumentation and control data and provides the processed information to the client. Therefore, the customer is not required to accumulate the instrumentation and control data and can be provided with the information corresponding to the service application from the server.

According to an embodiment of the invention, the instrumentation and control equipment is a temperature controller, and the instrumentation and control data includes at least the data on the operation amount and the control amount. Also, the contents of the services include at least one of the data accumulation service for accumulating the instrumentation and control data and providing the accumulated data in response to a request, the tuning service for providing the control parameter for the temperature controller, the modeling service for modeling and providing a model of the object of instrumentation and control, and the diagnosis service for checking for a temperature control fault of the temperature controller.

According to this invention, the client representing the customer receiving the service transmits at least the data on the operation amount and the control amount of the temperature controller to the server representing the service provider. The server accumulates the particular data, and in accordance with the request of the client, processes the accumulated data of the operation amount and the control amount, and transmits the processed information to the client. The processed information is the data of the operation amount and the control amount for the period required by the customer in the data accumulation service, the control parameter for the temperature controller in the tuning service, a model of the object of instrumentation and control in the modeling service, and the information on a possible fault in the diagnosis service. In this way, the customer can be provided with information corresponding to the respective services.

According to a preferred embodiment of the invention, the server executes the process corresponding to the contents of at least one of the data accumulation service, the tuning service, the modeling service and the diagnosis service. In the data accumulation service, the corresponding data are read from the accumulated data in response to the request of the client. In the tuning service, the control parameter is calculated using the model of the object of instrumentation and control based on the accumulated data of the operation amount and the control amount. In the modeling service, the object of instrumentation and control is modeled based on the accumulated data of the operation amount and the control amount. In the diagnosis service, the process of checking for a fault is executed based on the data of the operation amount and the control amount accumulated for the normal period and the diagnosis period.

According to this invention, the server representing the service provider provides the information on the result of carrying out the requested services executed in accordance with the contents of each service application. Specifically, the server reads the corresponding data from the accumulated data in the data accumulation service, calculates the control parameter based on the accumulated data of the operation amount and the control amount in the tuning service, executes the modeling operation based on the accumulated data of the operation amount and the control amount in the modeling service, and checks for a fault as a diagnosis based on the data of the operation amount and the control amount accumulated during the normal period and the diagnosis period in the diagnosis service. In this way, the customer transmits the data of the operation amount and the control amount, and by thus submitting an application for a specific service, can be provided with various information corresponding to the particular service.

According to another embodiment of the invention, the server urges the service providing party to input the required information, and based on the required information thus input, executes the process corresponding to the contents of at least one of the data accumulation service, the tuning service, the modeling service and the diagnosis service.

According to this invention, a person in charge associated with the service providing party inputs data for correcting the control parameter, for example, taking advantage of his experience and knowledge, and in this way, can provide a highly accurate control parameter which cannot be obtained only by the programmed automatic processing.

According to a yet further aspect of the invention, there is provided an instrumentation and control information providing server connected to a network for providing the services related to the instrumentation and control, in which the server receives from a client through the network the instrumentation and control data obtainable by measuring and controlling an object of instrumentation and control by the instrumentation and control equipment, and in accordance with the request of the client, processes the instrumentation and control data and provides the processed information to the client through the network.

According to this aspect of the invention, the instrumentation and control information providing server who is the service provider receives the instrumentation and control data from the client representing the customer, and in accordance with the request of the client, processes the instrumentation and control data and provides the processed information to the client. Thus, the customer is not required to accumulate or analyze the instrumentation and control data, and can be provided with the required instrumentation and control data and the information resulting from the analysis of the instrumentation and control data.

According to a still further aspect of the invention, there is provided an instrumentation and control information providing server connected to a network for providing the services related to the instrumentation and control, comprising an application receiving means for receiving an application for a service from a client connected to the network, a data accumulation means for accumulating the instrumentation and control data obtained from the client by measuring and controlling an object of instrumentation and control by the instrumentation and control equipment, a processing means for reading the instrumentation and control data accumulated in the data accumulation means and processing the instrumentation and control data in accordance with the service application received, and a communication means for receiving the instrumentation and control data from the client through the network and transmitting the information processed in the processing means through the network to the client.

According to this aspect of the invention, the instrumentation and control information providing server accumulates the instrumentation and control data from the client representing the customer and in accordance with the contents of the service application received, processes the accumulated instrumentation and control data, and provides the processed information to the client. The customer, therefore, is not required to accumulate the instrumentation and control data and can be provided with the information corresponding to the service application.

According to an embodiment of the invention, the instrumentation and control equipment is a temperature controller, and the instrumentation and control data includes at least the data of the operation amount and the control amount. Also, the services include at least one of the data accumulation service for accumulating the instrumentation and control data and providing the accumulated data in response to a request, the tuning service for providing the control parameter of the temperature controller, the modeling service for modeling the object of instrumentation and control and providing a model, and the diagnosis service for checking for a temperature control fault of the temperature controller as a diagnosis.

According to this embodiment of the invention, the instrumentation and control information providing server accumulates at least the data of the operation amount and the control amount of the temperature controller received from the client representing the customer, and in accordance with the service request of the client, processes the accumulated data of the operation amount and the control amount, and transmits to the client the processed information, which is the data of the operation amount and the control amount for the period required for the customer in the data accumulation service, the control parameter of the temperature controller in the tuning service, the model of an object of control in the modeling service, and the information on a possible fault in the diagnosis service. As a result, the customer can is provided with the information corresponding to the requested service.

According to a preferred embodiment of the invention, the process corresponding to the contents of at least one of the data accumulation service, the tuning service, the modeling service and the diagnosis service is executed. In the data accumulation service, the corresponding data are read from the accumulated data in compliance with the request of the client. In the tuning service, the control parameter is calculated using the model of an object of instrumentation and control based on the accumulated data of the operation amount and the control amount. In the modeling service, the object of instrumentation and control is modeled based on the accumulated data of the operation amount and the control amount. In the diagnosis service, the diagnosis process of checking for a fault is executed based on the data of the operation amount and the control amount accumulated during the normal period and the diagnosis period.

According to this invention, the server for providing the instrumentation and control information, in accordance with the contents of a specific service application received, reads the corresponding data from the accumulated data in the data accumulation service, calculates the control parameter based on the accumulated data of the operation amount and the control amount, models the object based on the accumulated data of the operation amount and the control amount in the modeling service, and makes a diagnosis by checking for a fault and provides the resulting information based on the data of the operation amount and the control amount accumulated during the normal period and the diagnosis period. Therefore, the customer can be provided with various information in accordance with a specific service by transmitting the data of the operation amount and the control amount and submitting an application for the particular service.

According to an embodiment of the invention, the service providing party is urged to input the required information, and based on the required information thus input, the process corresponding to the contents of at least one of the data accumulation service, the tuning service, the modeling service and the diagnosis service is executed.

According to this invention, the person in charge associated with the service providing party inputs data for correcting the control parameter, for example, taking advantage of his experience and knowledge, and thus can provide a highly accurate control parameter that could not be obtained only by the programmed automatic processing.

According to a yet further aspect of the invention, there is provided an instrumentation and control equipment connected to a network, comprising a communication means for transmitting to the server through a network the instrumentation and control data obtained by measuring and controlling an object of instrumentation and control, and an application means for browsing the contents of the services provided by the server and submitting an application for a service to the server.

According to this aspect of the invention, a service application is submitted by browsing the contents of a particular service, and the instrumentation and control data obtained by measurement and control are transmitted to the server representing the service providing party. Then, the server provides the information obtained by processing the instrumentation and control data in accordance with the contents of the service. Therefore, the information corresponding to the service application can be received without accumulating the instrumentation and control data.

According to an embodiment of the invention, the temperature of an object of instrumentation and control is measured to control the temperature. The instrumentation and control data include at least the data of the operation amount and the control amount. The application means is for applying for at least one of the data accumulation service, the tuning service, the modeling service and the diagnosis service. In the data accumulation service, the sever accumulates the instrumentation and control data and provides the accumulated data in response to a request. In the tuning service, the server provides the control parameter for the instrumentation and control equipment. In the modeling service, the server models the object of instrumentation and control and provides a model. In the diagnosis service, the server makes a diagnosis by checking for a temperature control fault of the instrumentation and control equipment.

According to this invention, at least the data of the operation amount and the control amount is transmitted from the instrumentation and control equipment to the server representing the service provider. The server accumulates the particular data, and in response to a service request from the instrumentation and control equipment, processes the accumulated data of the operation amount and the control amount, and transmits the processed information to the instrumentation and control equipment. The processed information are the data of the operation amount and the control amount for the period required by the customer in the data accumulation service, the control parameter for the temperature controller in the tuning service, a model of the object of control in the modeling service, or the information on a possible fault in the diagnosis service. Thus, the customer can be provided with the information corresponding to a specific service.

BRIEF DESCRIPTION OF THE DRAWINGS

FIG. 4 shows an image of the screen for submitting an application for the data accumulation service.

FIG. 16 shows an image of a screen for applying for the diagnosis service.

DESCRIPTION OF THE PREFERRED EMBODIMENTS

Embodiments of the invention are explained in detail below with reference to the drawings.

First Embodiment

Figure 1:
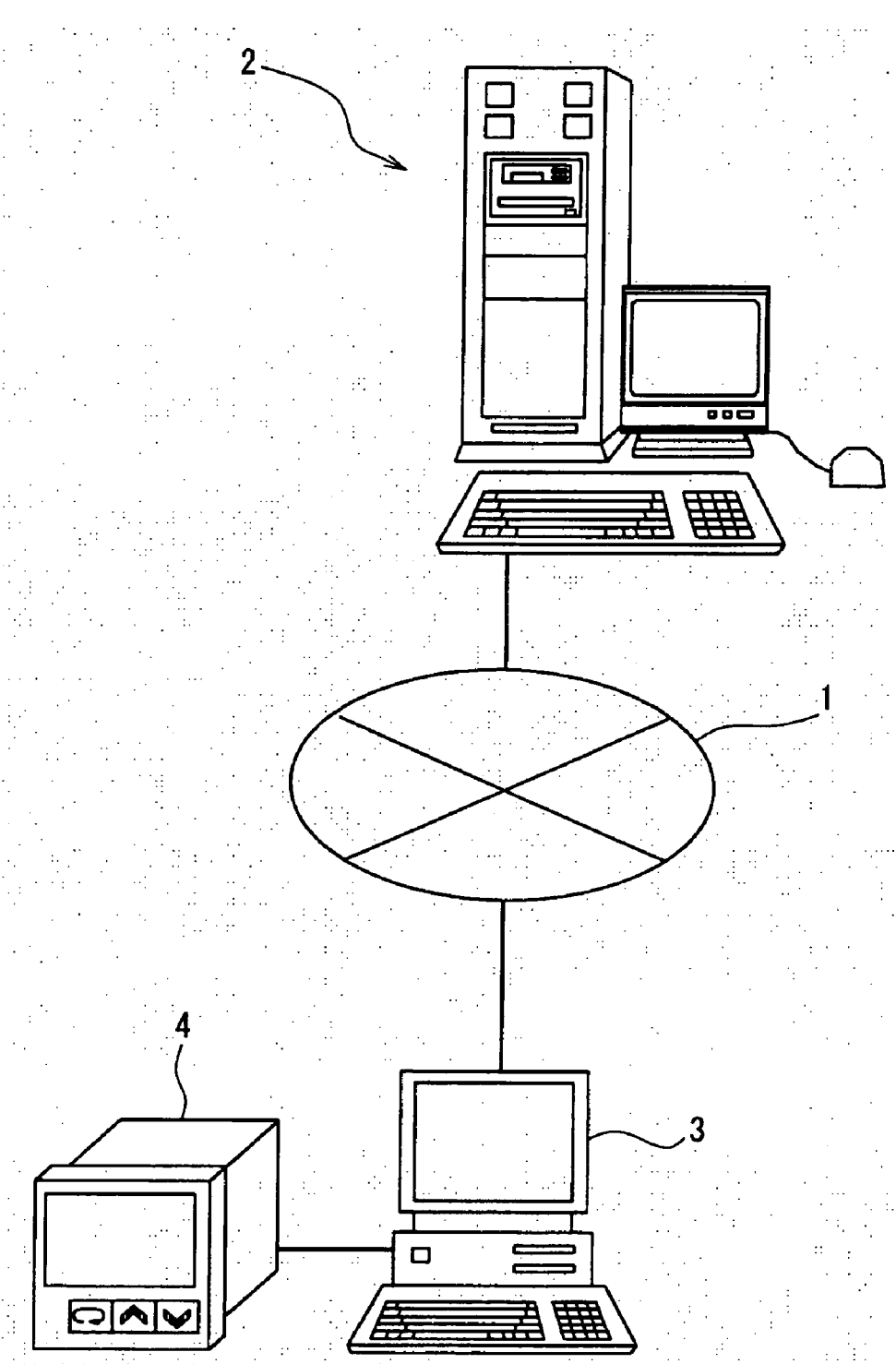
FIG. 1 shows a configuration of an instrumentation and control information providing system according to an embodiment of the invention.

FIG. 1 shows a configuration of an instrumentation and control information providing system according to this invention.

In the instrumentation and control information providing system according to this embodiment, a service provider for providing services and a plurality of customers (of which only one is shown) receiving the services are connected to each other through an internet 1 making up a communication network. The service provider has an instrumentation and control information providing server 2 constituting a WWW (World Wide Web) server, while the client representing the customer has a personal computer 3 by which the home page of the service provider can be accessed and browsed using the WWW browser, and a temperature controller 4 as an instrumentation and control equipment connected to the personal computer 3 through, for example, RS232C. On the customer side, the temperature of an object of control not shown is measured to control the temperature using the temperature controller 4, and the data including the operation amount, the control amount and the target amount of the temperature controller 4 are supplied to the personal computer 3. As an alternative to RS232C, a serial communication or a parallel communication including a field bus such as RS485, RS422 or a device net may be employed.

The instrumentation and control information server 2 is arranged on the service provider side, and may be arranged on the instrumentation and control equipment maker side, the service provider side or the user side having a multiplicity of control devices. Also, the instrumentation and control information providing server 2 may be configured of a plurality of computers.

The client is on the receiving side of the services and either the customer or the user.

In the instrumentation and control information providing system according to this embodiment, the service provider, in response to the request of the customer, receives and accumulates the various data on the temperature controller 4 of the customer such as the data of the operation amount and the control amount (detected temperature) through the internet 1, and by processing the data thus accumulated, provides various information.

The services thus provided basically include the data accumulation service in which the various data transmitted from the temperature controller 4 of the customer through the personal computer 3 are received in the server 2, accumulated and provided as required to the personal computer 3, the tuning service for calculating the PID gain constituting the control parameter for the temperature controller 4 based on the accumulated data and providing the calculated PID gain to the personal computer 3, the modeling service in which a model of an object of control for the temperature controller 4 is produced based on the accumulated data and provided to the personal computer 3, and the diagnosis service for making a diagnosis by checking for a temperature control fault based on the accumulated data and providing the result of diagnosis to the personal computer 3.

Figure 2:
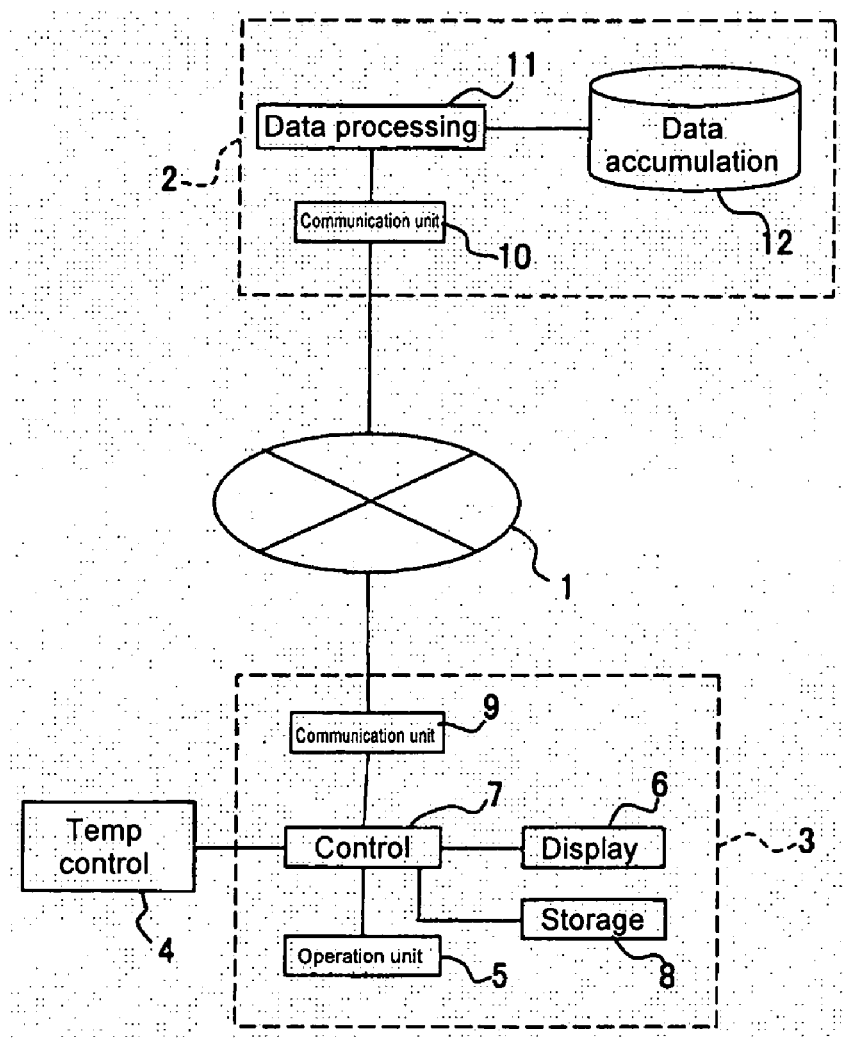
FIG. 2 is a block diagram showing the functions of the instrumentation and control information providing system of FIG. 1.

FIG. 2 is a block diagram showing the functions of the system shown in FIG. 1.

The personal computer of the customer includes an operating unit 5 such as a keyboard and a mouse, a display unit 6 such as a liquid crystal display, a control unit 7 such as a microcomputer, a storage unit 8 such as a hard disk and a communication unit 9. The operating unit 5, the display unit 6 and the control unit 7 have the function as an application means used by the customer to apply for a service.

The instrumentation and control information providing server of the service provider includes a communication unit 10, a data processing unit 11 for executing the process corresponding to a service described later and receiving a service application, and a data accumulation unit 12 such as a hard disk for accumulating the instrumentation and control data supplied from the customer.

The personal computer 3 of the customer is so configured that the various data such as the operation amount and the control amount constituting the instrumentation and control data of the temperature controller 4 accumulated by the service provider are compressed, transmitted in encrypted form, and when the line is busy, temporarily stored in the storage unit 8 so as to be transmitted upon restoration of the line condition.

The instrumentation and control information providing server 2 of the service provider, on the other hand, develops and decrypts the received data, accumulates the received data in the data accumulation unit 12 such as the hard disk, and in compliance with a request of the customer, executes the tuning or modeling process described above in the data processing unit 11, and provides the processed information to the customer.

Next, the various services provided according to this embodiment are explained.

(1) Data Accumulation Service

In the data accumulation service, in compliance with an application for the data accumulation service from the personal computer 3 of the client, the instrumentation and control information providing server 2 receives the required data including the operation amount and the control amount (detected temperature) for temperature control of the temperature controller 4 through the internet 1 and stores them in the data accumulation unit 12 such as the hard disk. Further, in response to a request of the client, the corresponding data is read from the data storage unit 12, and provided to the client through the internet 1. As a result, the client can receive the required data from the service provider without accumulating the data.

In the case where a temperature control fault occurs on the client side, for example, the data are received from the instrumentation and control information providing server 2, and based on the particular data, the time point when the fault occurred can be specified by the customer.

Figure 3:
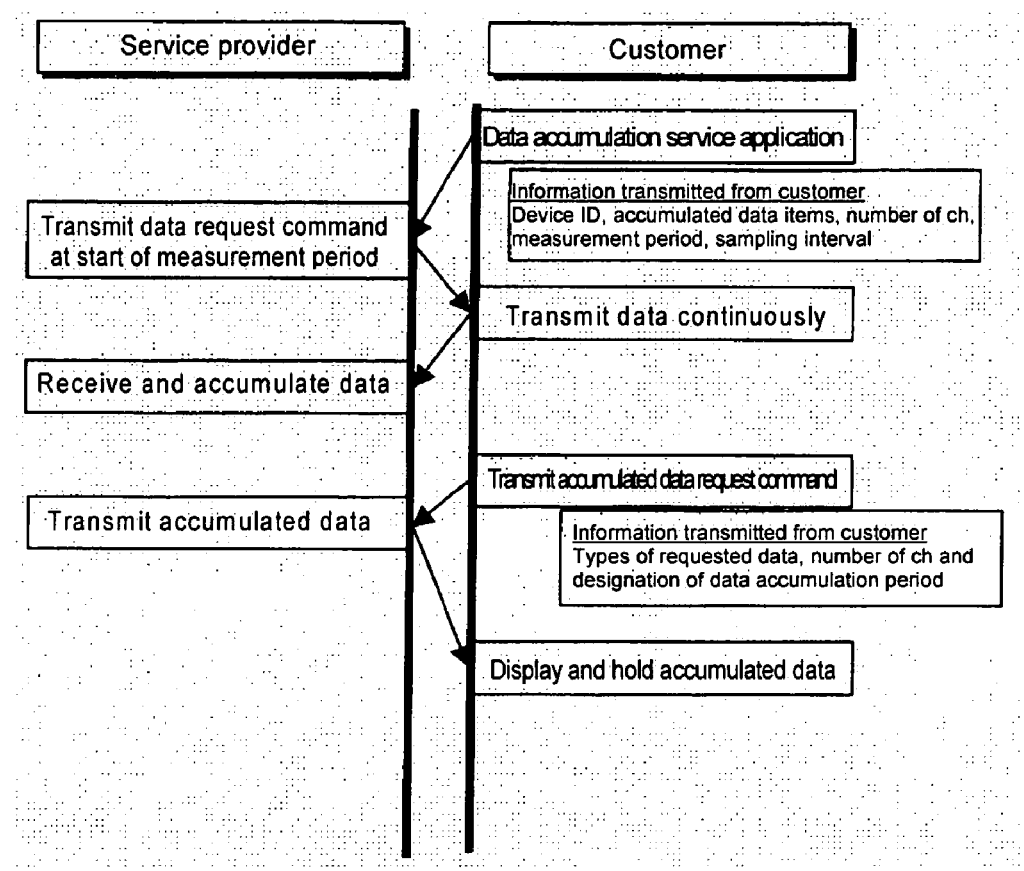
FIG. 3 is a diagram for explaining the process of providing the data accumulation service.

FIG. 3 is a diagram for explaining the process of executing the data accumulation service.

First, the customer representing the client browses the contents of the service by accessing the home page of the service provider, and files an application for the data accumulation service from the personal computer 3.

FIG. 4 shows an image of the screen for submitting an application to receive the data accumulation service. As shown in FIG. 4A, the device ID for specifying the temperature controller 4 of the customer is input. In the case where a plurality of channels are controlled by the temperature controller 4, however, the channel numbers and the data accumulation period are also input. Then, the OK button is clicked. The screen shown in FIG. 4B is displayed for inputting the items of the accumulated data including the sampling intervals, temperature and the operation amount.

The instrumentation and control information providing server 2, upon receipt of an application for the data accumulation service from the customer, transmits a data request command to the client personal computer 3 at the start of the data accumulation measurement period as shown in FIG. 3. The personal computer 3 continuously transmits the data to be accumulated received from the temperature controller 4 to the instrumentation and control information providing server 2 through the internet 1, while the server 2, receiving, developing and decoding the data, accumulate them in the data accumulation unit 12 such as a hard disk.

Figure 5A:
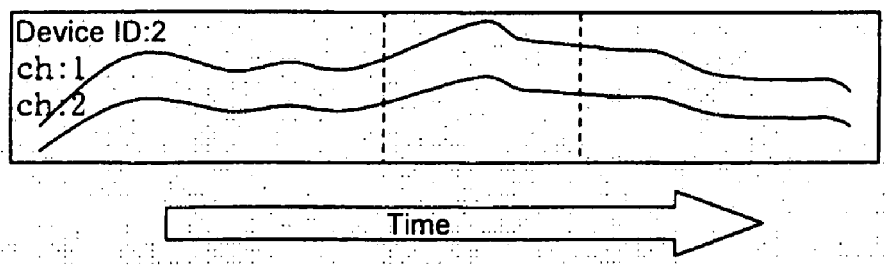
FIG. 5 is a diagram showing an image of the data accumulation and the data provided.

FIG. 5A is a diagram showing an image of data accumulation. The device ID and such data as the control amount and the operation amount for each channel are accumulated.

In the case where the customer requests the accumulated data, or for example, in the case where a temperature control fault occurs and the data are required to specify the time point of the fault occurrence, the personal computer 3 of the customer accesses the home page of the service provider and requests the required accumulated data.

Figures 6A, 6B:
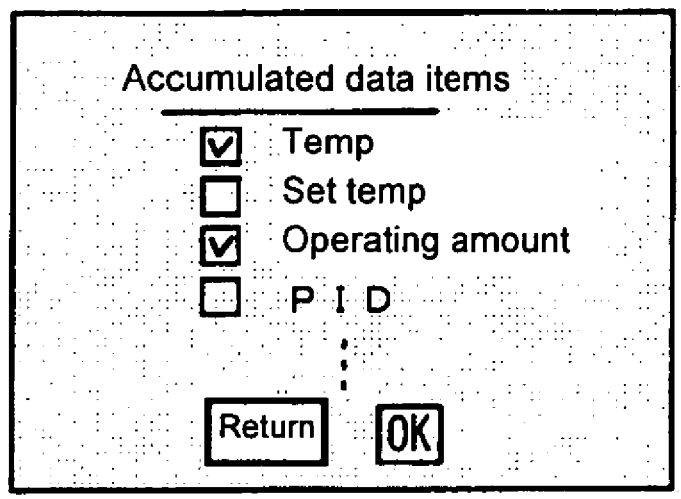
FIG. 6 shows an image of a data request screen for the data accumulation service.

FIG. 6 shows an image of the screen for requesting the accumulated data. As shown in FIG. 6A, the device ID for specifying the temperature controller 4 corresponding to the required data, the channel number and the period for the required data are input. Then, the OK button is clicked. As shown in FIG. 6B, the items of the accumulated data are displayed.

The instrumentation and control information providing server 2, as shown in FIG. 3, upon receipt of the command requesting the accumulating data, reads the requested data from the data accumulation unit 12, and transmits them to the personal computer 3 of the customer through the internet 1.

Figure 5B:
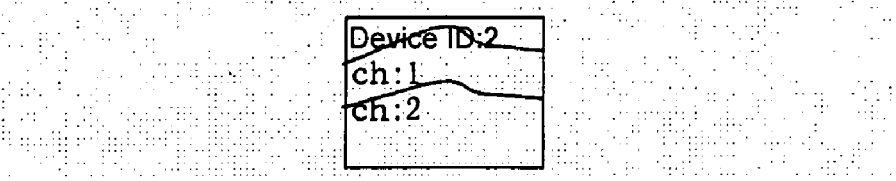

On the customer side, the data from the service provider are received and stored. At the same time, as shown in FIG. 5B, the received data are displayed. FIG. 5B shows a case in which of the accumulated data of FIG. 5A, the data for the period indicated by the dashed line are requested.

Next, an explanation is given about the data analysis service for analyzing the data accumulated by the data accumulation service and providing the result to the customer, or specifically, the tuning service, the modeling service and the diagnosis service.

Figure 7:
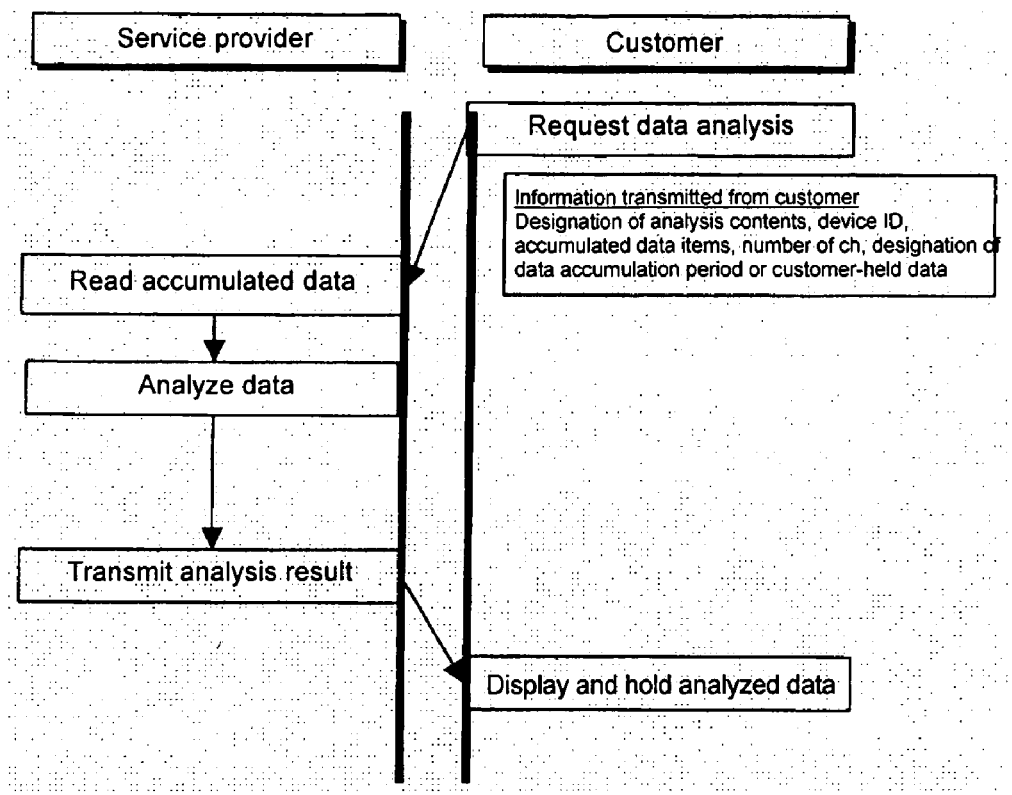
FIG. 7 is a diagram for explaining the process of providing the data analysis service.

FIG. 7 is a diagram for explaining the process of the service for analyzing the accumulated data.

The customer accesses the home page of the service provider, and browsing the contents of the data analysis service, submits a service application from the personal computer 3. In the process, the analysis service designation, the equipment ID, the channel number, the items of the accumulated data and the data accumulation period are input.

In response to the application for the data analysis service from the customer, the instrumentation and control information providing server 2 receives the service application, reads the corresponding accumulated data from the data accumulation unit 12, analyzes the data in accordance with the contents of the service application received, and transmits the analysis result to the personal computer 3 of the customer through the internet 1.

The customer receives the analysis result data from the service provider and stores and displays it.

The modeling service, the tuning service and the diagnosis service constituting the data analysis service are explained below.

Figure 8:
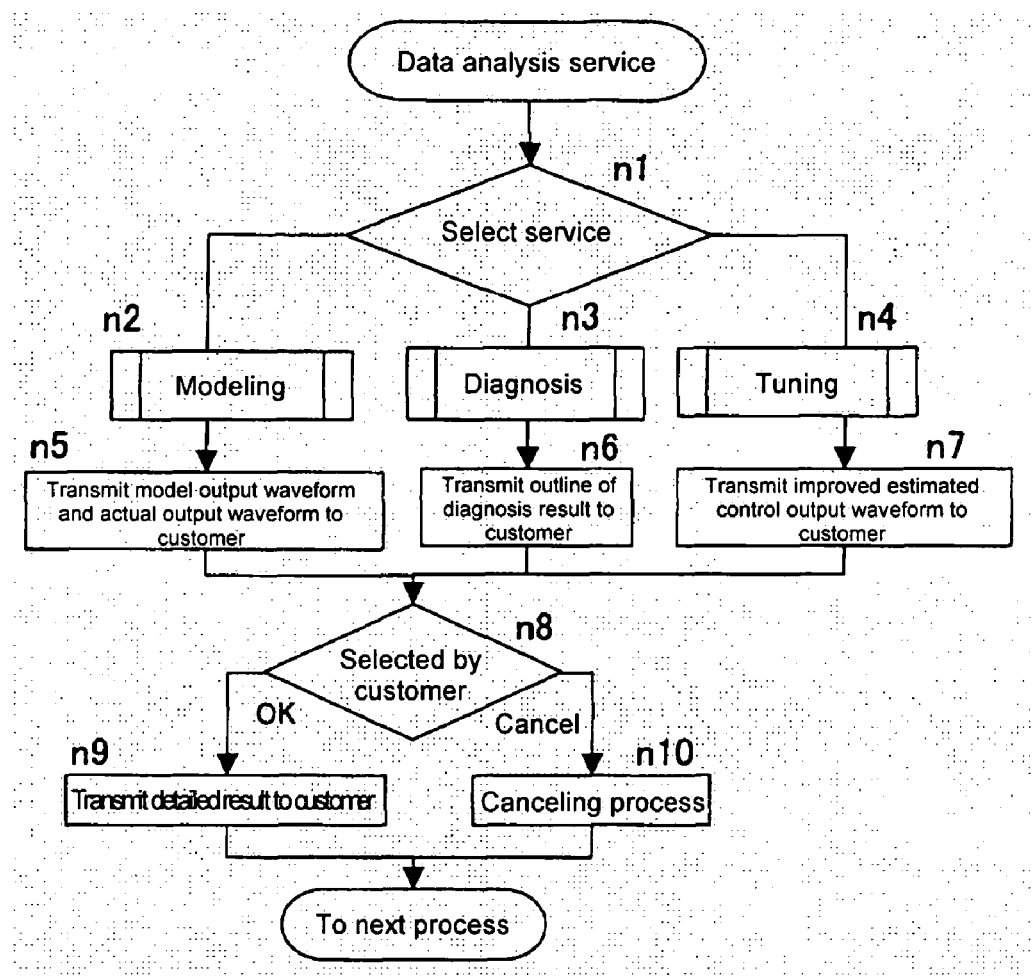
FIG. 8 shows a flowchart for explaining the operation of providing the data analysis service.

FIG. 8 is a flowchart for explaining the operation of the instrumentation and control information providing server 2 for the data analysis service.

First, it is determined which data analysis service is selected (step n1). In the case where the modeling service is selected, the object of control is modeled as described later (step n2), the output waveform using the model and the actual output waveform data based on the accumulated data are transmitted to the customer (step n5). Then, it is determined whether the selection is made by the customer or not (step n8), and in the case where OK is selected by the customer, the detailed result is transmitted to the customer (step n9), while the canceling process is executed in the case where the selection is canceled.

In the case where the diagnosis service is selected in step n1, the diagnosis is carried out as described later (step n3), and after the outline of the diagnosis result is transmitted to the customer, the process proceeds to step n8 (step n6). In the case where the tuning service is selected, on the other hand, the tuning process is executed as described later (step n4), and the estimated control output waveform after tuning is transmitted to the customer, followed by proceeding to step n8 (step n7).

Each data analysis service is explained in more detail below.

(2) Modeling Service

In the modeling service, a model of an object controlled in temperature by the temperature controller 4 of the customer is produced by use of the data accumulated by the data accumulation service or the data accumulated in advance for the modeling service, and provided to the customer. As a result, the customer, receiving a model of an object of control that could not be easily produced by the customer, can carry out various simulations.

Figure 9A:
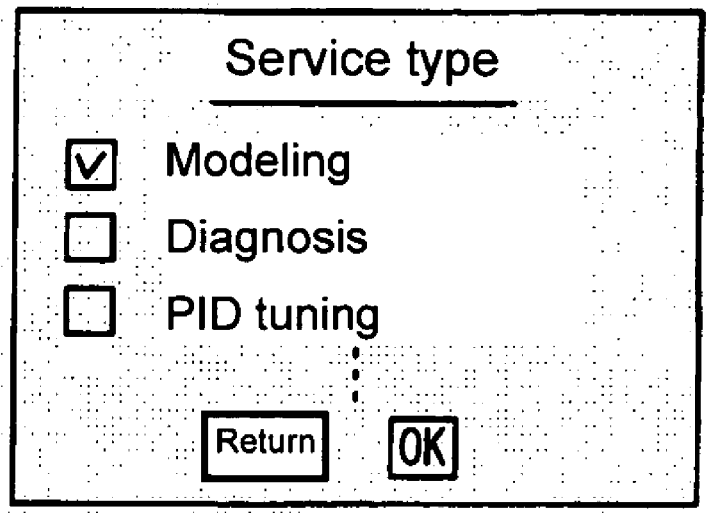
FIG. 9 shows an image of a service select screen for the data analysis service.

FIG. 9 shows a screen for selecting the type of the data analysis service. Upon selection of a modeling shown in FIG. 9A, the data select screen shown in FIG. 10A is displayed. In this data select screen, the device ID for identifying the temperature controller 4 of the customer is input. In the case where the temperature controller 4 controls a plurality of channels, the channel numbers and the accumulation period of the data used for modeling are also input, and if required, the order of the model is input, followed by clicking OK.

Figure 11:
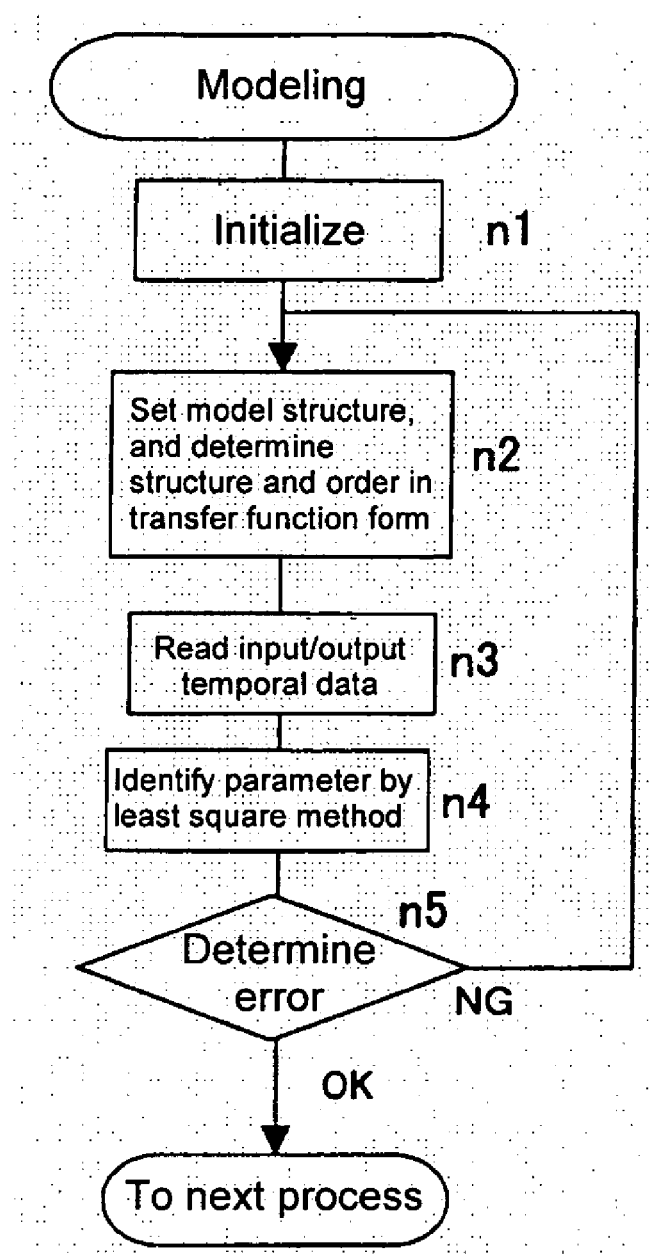
FIG. 11 is a flowchart for explaining the operation of the modeling service.

FIG. 11 is a flowchart for explaining the process of the modeling service.

The first step is initialization (step n1). This initialization is for setting the device ID, the channel number and the data accumulation period for modeling which are input in FIG. 10A.

Next, a model structure is determined. According to this embodiment, the structure and the order in the form of transfer function shown in equation (1) below are determined (step n2).

[Equation 1]

$$\frac{b_m Z^m + b_{m-1} Z^{m-1} \ldots + b_1 Z + b_0}{a_n Z^n + a_{n-1} Z^{n-1} \ldots + a_1 Z + a_0} \quad (1)$$

where the order is the third order, for example, and may alternatively be designated by the customer.

Next, of the accumulated data, the data of the operation amount and the control amount (temperature) constituting the input/output temporal data for the set period are read (step n3). The parameters ($a_0$ to $a_n$, and $b_0$ to $b_n$) of the model structure shown in equation 1 above are identified by, for example, the least square method (step n4).

Figure 12:
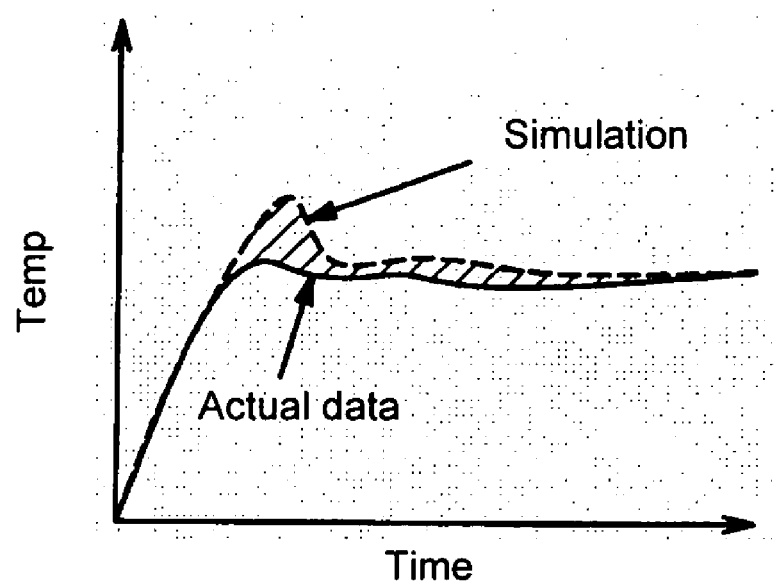
FIG. 12 is a diagram for explaining the error determination in FIG. 11.

Next, as shown in FIG. 12, an area (hatched portion) corresponding to the difference between the simulation waveform (dashed line) employing the model structure based on an identified parameter and the actual output waveform (solid line) based on the accumulated data is determined as an error (step n5). In the case where the error is not more than a threshold value, the process proceeds to the next step, i.e. step n5 shown in FIG. 8, while in the case where the threshold value is exceeded, the order of the model structure is increased to execute a similar process.

Figure 10A:
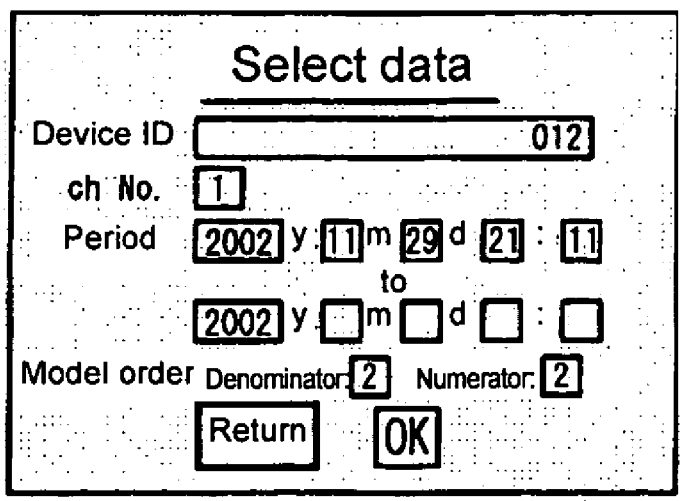
FIG. 10 shows an image of a modeling service screen.
Figure 10B:
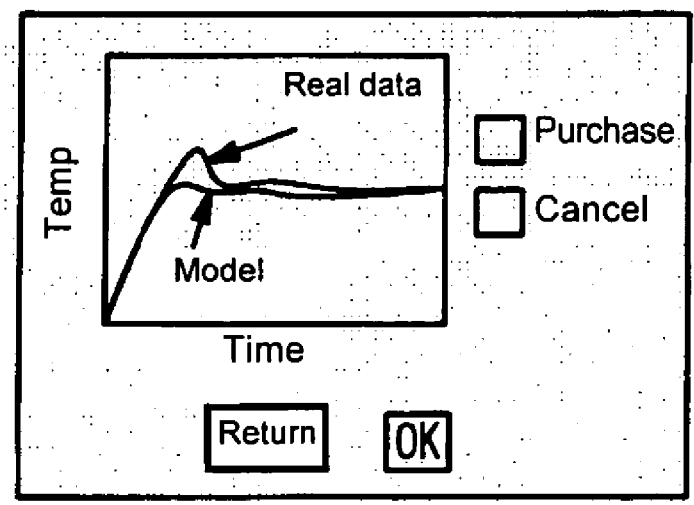
Figure 10C:
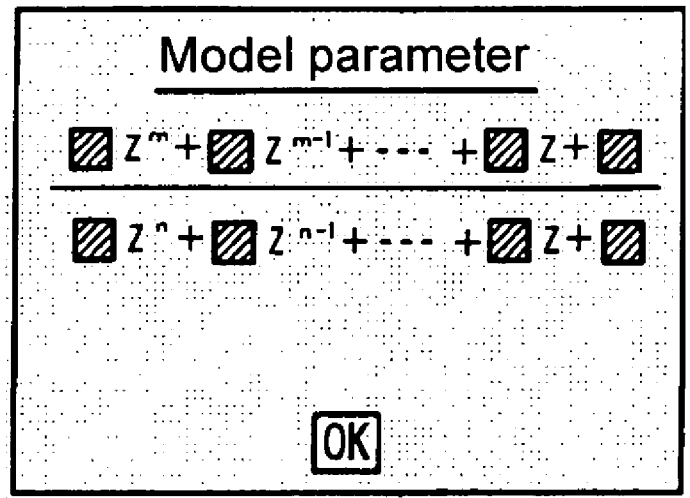

The simulation waveform employing a model structure determined as above and the actual output waveform are transmitted to the customer. The customer views the screen shown in FIG. 10B, performs the operation to determine whether the model structure is to be purchased or canceled. In the case where the model structure is purchased, the model structure shown in FIG. 10C is transmitted from the instrumentation and control information providing server 2 and displayed on the screen while at the same time being stored.

As a result, the customer can make various simulations using the model structures provided.

(3) Tuning Service

In the tuning service, the appropriate PID gain (proportionality band, integration time, differentiation time) of the temperature controller 4 of the customer is calculated using the data accumulated by the data accumulation service or the data accumulated beforehand for the tuning service and provided to the customer. The customer, therefore, can control the temperature by setting the PID gain in the temperature controller 4.

Figure 9B:
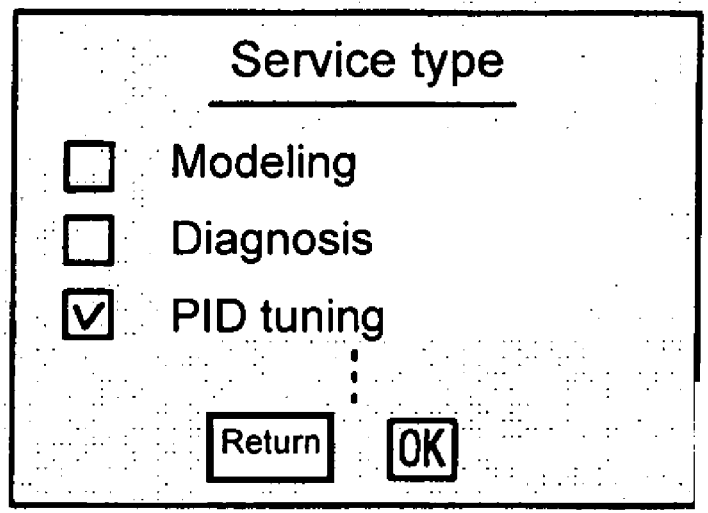
Figures 13A, 13B, 13C:
FIG. 13 shows an image of the screen for the tuning service.

In the screen shown in FIG. 9 for selecting the type of the data analysis service, assume that the PID tuning is selected as shown in FIG. 9B. The data select screen shown in FIG. 13A is displayed. On this data select screen, the device ID for specifying the temperature controller 4 of the customer is input. Further, in the case where a plurality of channels are controlled by the temperature controller 4, the channel numbers and the data accumulation period used for tuning are also input. Then, the OK button is clicked.

Figure 14:
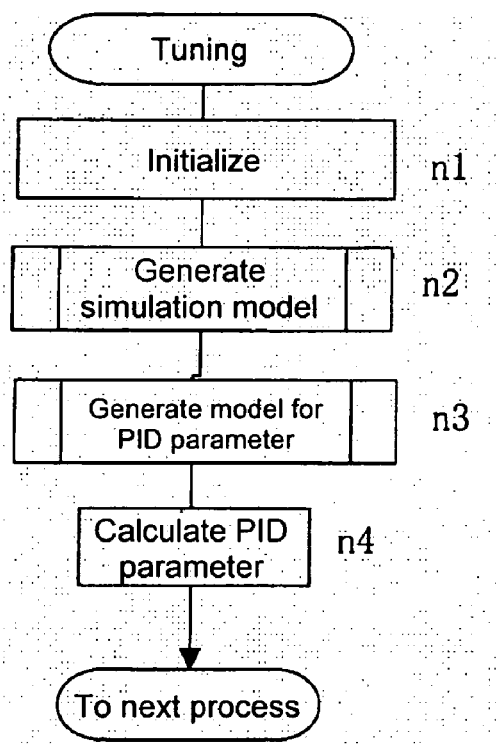
FIG. 14 is a flowchart for explaining the operation of the tuning service.

FIG. 14 is a flowchart for explaining the process of providing the tuning service.

The first step is initialization (step n1). In this initialization, the device ID, the channel number and the data accumulation period used for tuning which are input in FIG. 13A above are set.

Next, in a similar manner to the process for the modeling service shown in FIG. 11, the object of control for simulation is modeled using, for example, the third-order model structure of equation (1) above (step n2). Further, like the above-mentioned modeling service process, a simple model for calculating the PID gain or, for example, a model including the overhead time and the first-order delay system is produced (step n3). Using this simple model, the PID gain is calculated by, for example, the CHR method, followed by proceeding to the next step n7 in FIG. 8 (step n4).

Figure 15:
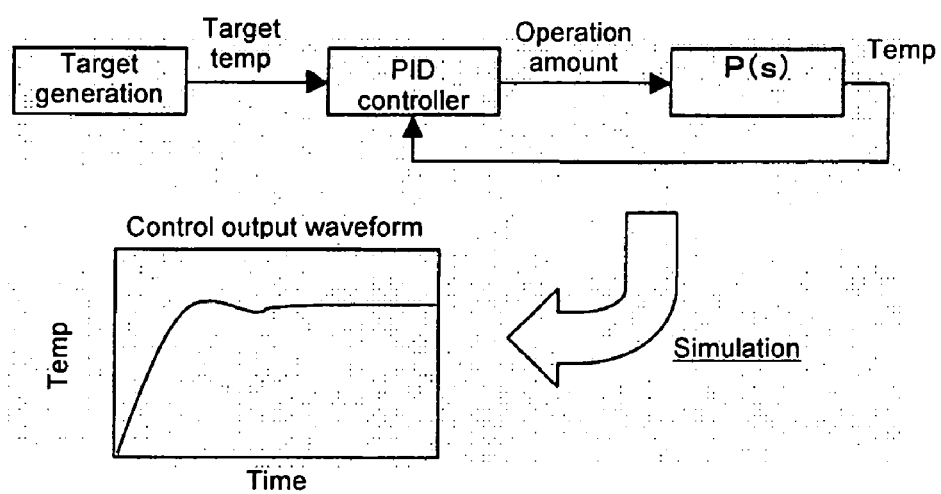
FIG. 15 is a diagram for explaining a simulation of the tuning service.

Specifically, using the model P(s) of the object of control for simulation and the calculated PID gain, as shown in FIG. 15, the PID control is simulated and the resulting simulation output waveform is produced and transmitted to the customer.

The customer, watching the screen of the simulation output waveform shown in FIG. 13B, performs the operation to determine whether to purchase or cancel, and in the case of purchase, the PID gain shown in FIG. 13C is transmitted from the instrumentation and control information providing server 2 and displayed on the screen and stored.

As a result, the customer can set the appropriate PID gain in the temperature controller 4 for the purpose of control.

(4) Diagnosis Service

The diagnosis service is to check for a fault of the temperature control operation of the temperature controller 4 on customer side using the data accumulated by the data accumulation service or the data accumulated in advance for diagnosis service. This service eliminates the difficult checking for a fault which otherwise might be needed on the part of the customer.

Figure 9C:
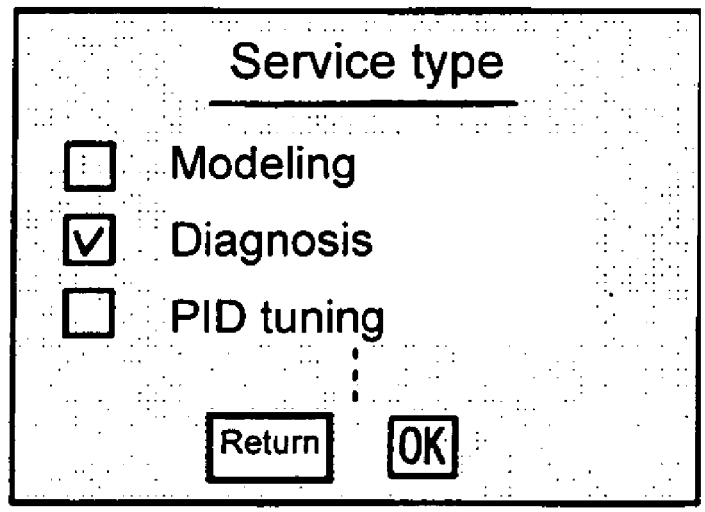

In the screen for selecting the data analysis service shown in FIG. 9, assume that the diagnosis is selected as shown in FIG. 9C. The data select screen shown in FIG. 16A is displayed. On this data select screen, the device ID for identifying the temperature controller 4 of the customer is set. In the case where a plurality of channels are controlled by the temperature controller 4, however, the channel numbers and the data accumulation period determined as normal by the customer are also input. Then, the OK button is clicked. The screen for inputting the diagnosis period shown in FIG. 16B is displayed. On this input screen, the device ID for specifying the temperature controller 4 for the object of control is input. In the case where a plurality of channels are controlled by the temperature controller 4, however, the channel numbers and the data accumulation period desired to be diagnosed are also input. Then, the OK button is clicked.

Figure 17:
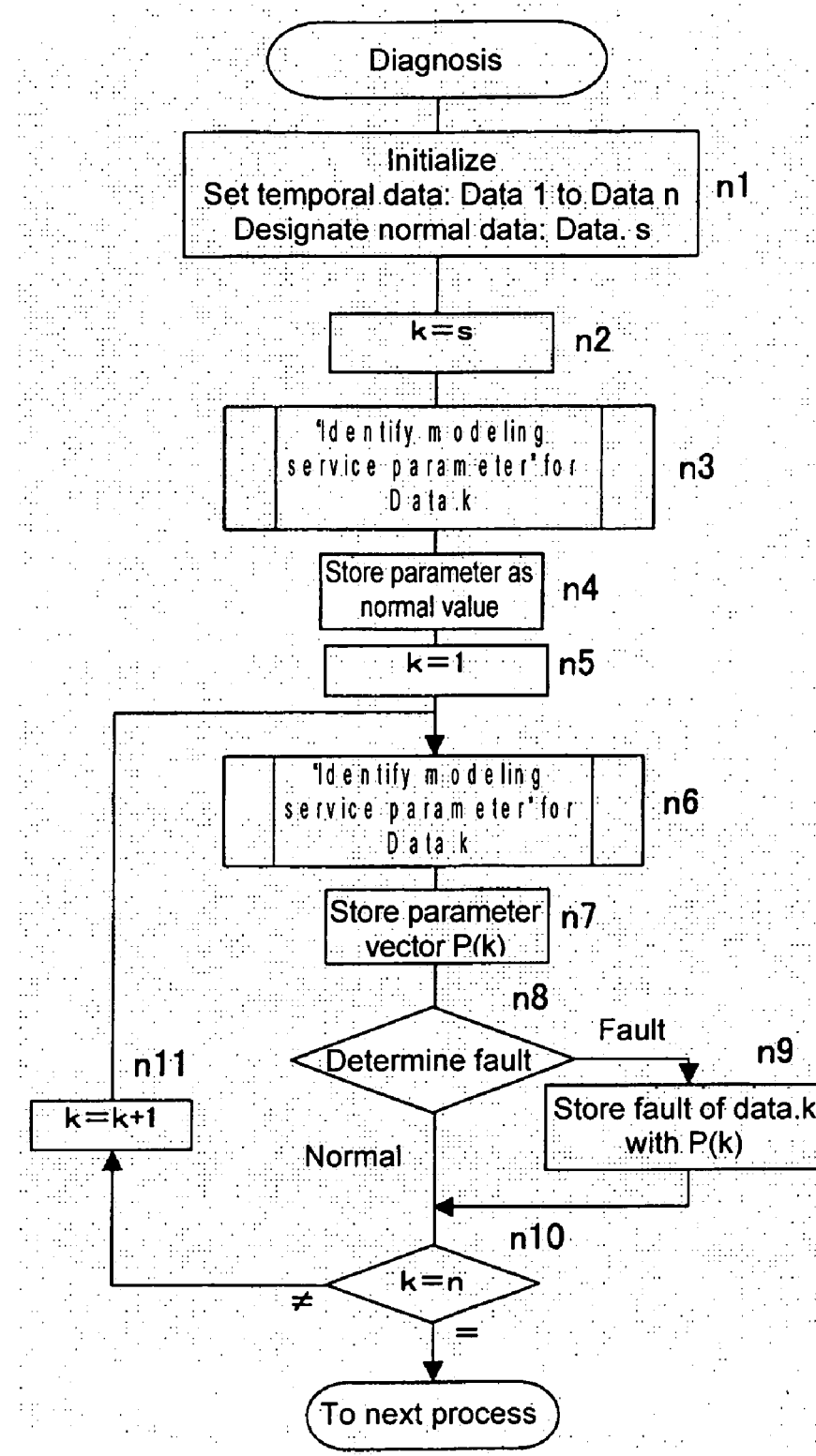
FIG. 17 is a flowchart for explaining the operation of the diagnosis service.

FIG. 17 is a flowchart for explaining the process of providing the diagnosis service.

The first step is for initialization (step n1). This initialization is to set the temporal data including the device ID, the channel numbers, the normal data accumulation period (Data s) and the data accumulation period (Data 1 to Data n) for diagnosis, which are input in FIG. 16.

Next, the data (Data s) for the normal data accumulation period is set as the first data k (step n2), and like the aforementioned modeling service, the parameters ($a_0$ to $a_n$, $b_0$ to $b_n$) for the model of the object of control are identified (step n3). Then, the calculated parameters are stored as parameters for the normal state (step n4).

Next, the first diagnosis period (k=1) is set (step n5), and like the modeling service described above, the parameters for the model of the object of control are identified (step n6). In this case, the parameters are identified by the least square method. The parameters sequentially calculated are stored as parameter vectors P(k) (step n7) and compared with the parameters in normal state held in step n4 thereby to check for a fault (step n8). In the presence of a difference of a predetermined threshold value or more, a fault is determined, and the fact that Data k is abnormal is stored together with the parameter vector P(k), followed by proceeding to step n10 (step n9). In the case where it is determined that no fault has occurred, on the other hand, the process proceeds to step n10 to determine whether the diagnosis for the entire diagnosis period is completed or not, and in the case where the diagnosis is not so completed, the next diagnosis period is set and the process returns to step n6 (step n11).

Upon completion of the diagnosis for the entire diagnosis period, the process proceeds to the next step, i.e. step n6 in FIG. 8, where an outline of the diagnosis result is transmitted to the customer.

Figure 18A:
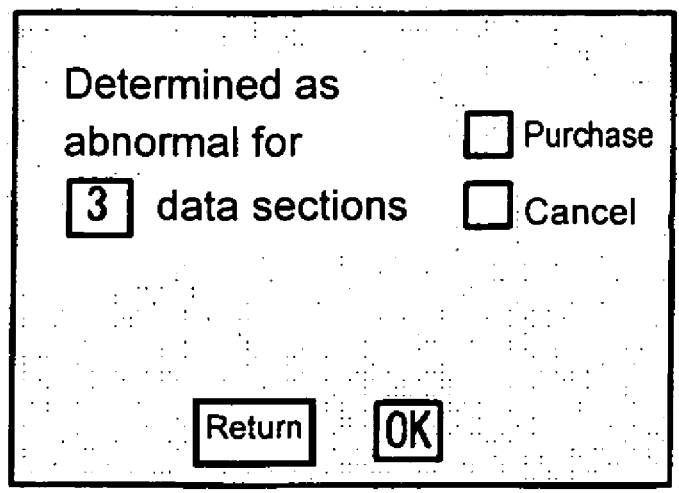
FIG. 18 is a diagram showing an image of the screen for the diagnosis result.
Figure 18B:
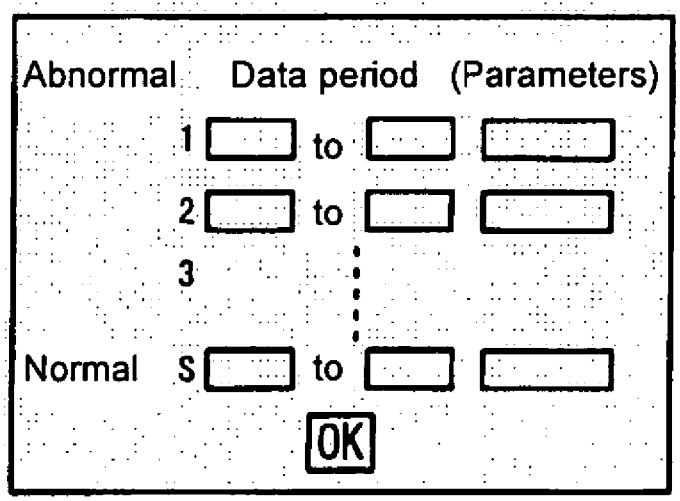
Figure 18C:
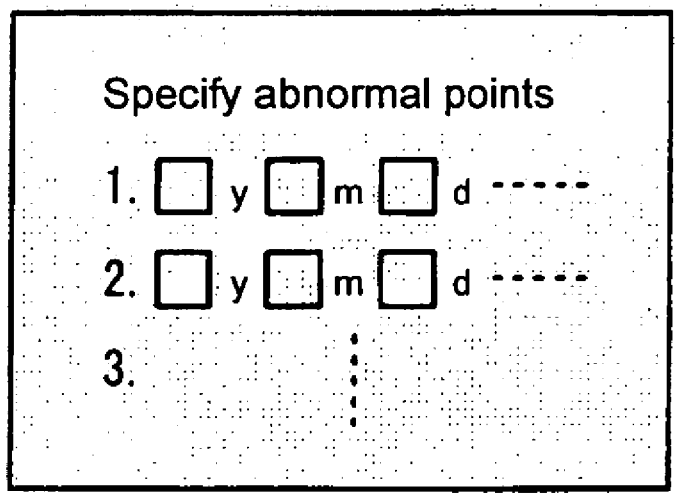

The customer, watching the screen showing the outline of the diagnosis result in FIG. 18A, performs the operation to determine whether to purchase or cancel. In the case of purchase, the parameters for the normal period and the diagnosis period determined as abnormal in FIG. 18B are transmitted from the instrumentation and control information providing server 2 and displayed on the screen. Further, the date and time when the fault is determined are displayed by clicking the OK button.

As a result, the customer can specify the time point when a fault occurred.

Next, the compression of the data from the temperature controller 4 in the personal computer 3 according to this embodiment is explained. The personal computer 3 has a feature in data compression in order to reduce the capacity for accumulating the data in the instrumentation and control information providing server 2 and also to securely sample (store) the steep change of the data.

Figure 19:
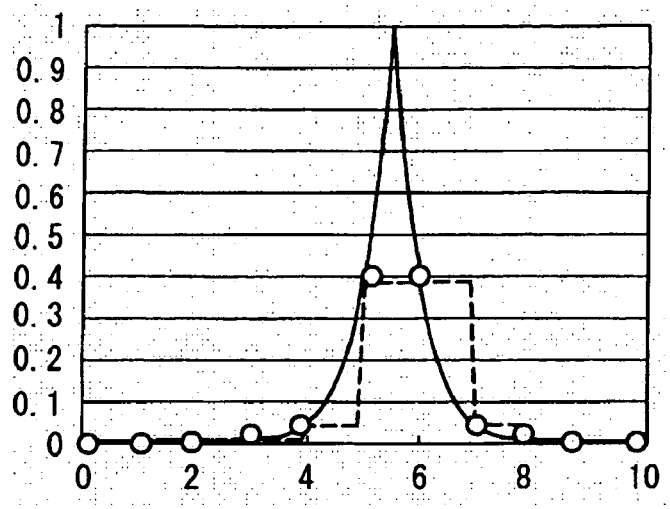
FIG. 19 is a diagram showing the data compression according to the prior art.

FIG. 19 is a diagram for explaining the conventional data compression. In FIG. 19, the solid line represents the original signal waveform, and the dashed line a signal waveform compressed and restored. The abscissa represents the time, and the ordinate the signal level.

In the prior art, the data are compressed by sampling (storing) the data at a predetermined sampling interval, and the data indicated by the dashed line is obtained by the development by 0-order hold.

The prior art in which the data are compressed by being stored at predetermined sampling intervals poses the problem that the steeply changing portion cannot be accurately restored.

Figure 20:
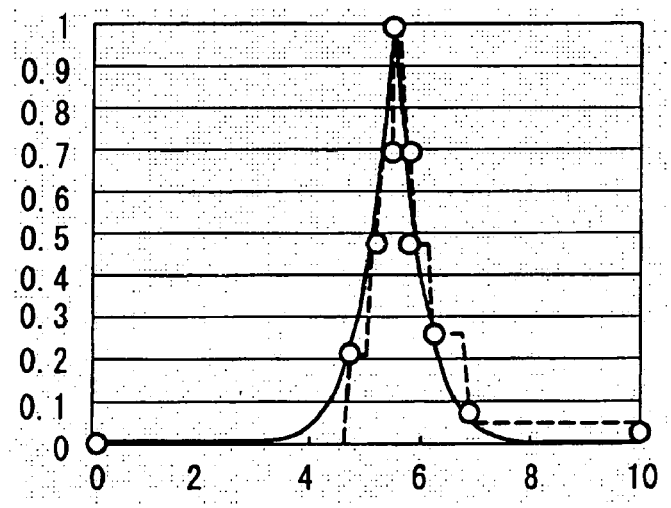
FIG. 20 is a diagram showing the data compression according to the embodiment shown in FIG. 1.

In view of this, according to this embodiment, the data are not stored at predetermined sampling intervals, but, as shown by dashed line in FIG. 20, the data associated with a change beyond a predetermined threshold value is held. In this way, as compared with the prior art, the data associated with the portion not changed is reduced, while the data of the portion undergoing a steep change are held at smaller sampling intervals than in the prior art.

Figure 21:
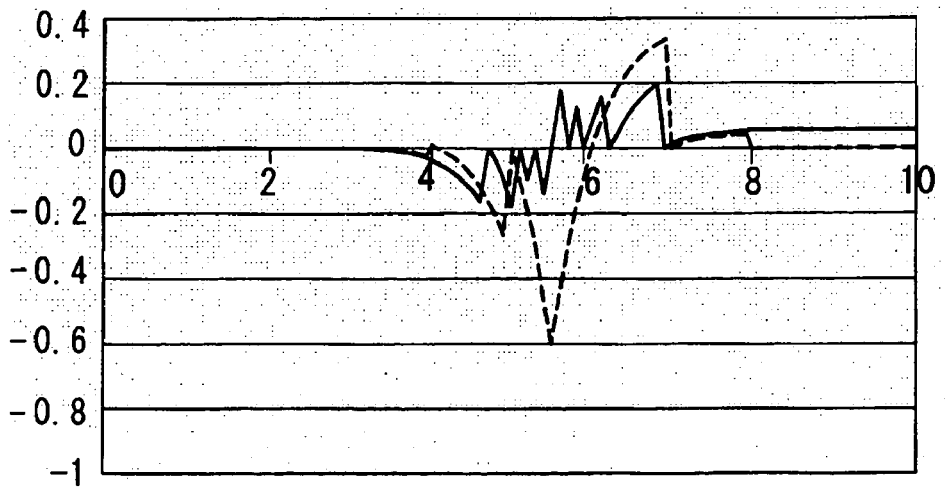
FIG. 21 shows a comparison of the data compression between the prior art and an embodiment of the invention.

FIG. 21 is a diagram showing the comparison between the prior art (dashed line) of FIG. 19 and the embodiment (solid line) shown in FIG. 20. In FIG. 21, the difference with the original signal is shown.

As shown in FIG. 21, according to the embodiment represented by the solid line, as compared with the prior art shown by the dashed line, the difference with the original signal is reduced, while at the same time reducing the number of the data held, as shown in FIGS. 19 and 20.

Figure 22:
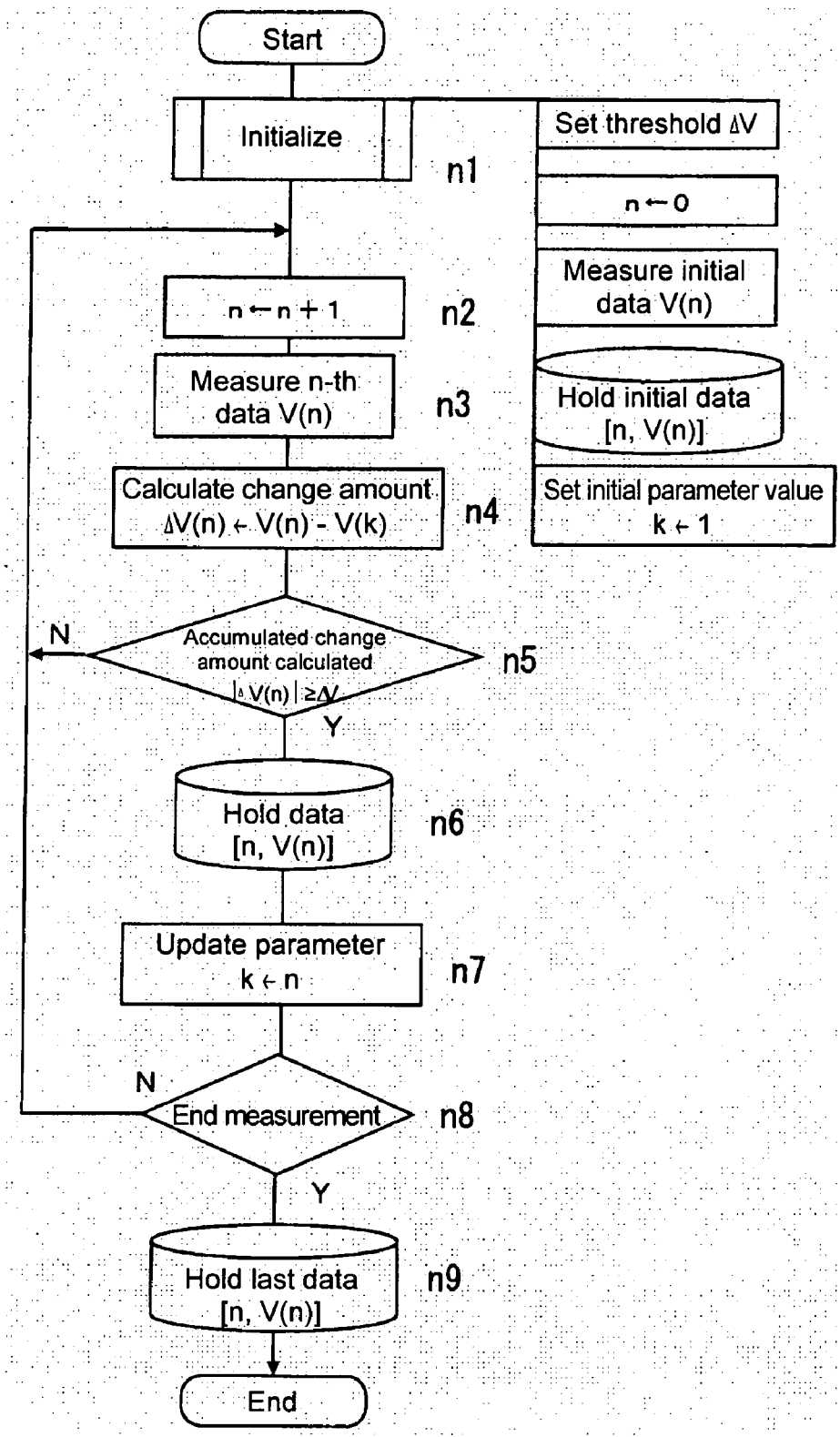
FIG. 22 is a flowchart for explaining the operation in FIG. 20.

FIG. 22 is a flowchart for explaining the data compression operation according to this embodiment.

First, the initialization process is executed (step n1). In this initialization process, a threshold value ΔV as to whether the data is held or not is set, the sampling number n is cleared, the initial data providing the first sampling data are measured and held, and the initial value of the parameter k is set.

Next, the sampling number n is incremented (step n2), the data is measured (step n2), the change amount Δ providing the difference with the preceding data is calculated (step n4), the accumulated change amount providing the accumulation of the change amount Δ is calculated and it is determined whether the absolute value of the accumulated change amount is not less than a threshold value or not (step n5), the process is returned to step n2 in the case where the absolute value of the accumulated change amount is less than the threshold value while the data is held in the case where the absolute value of the accumulated change amount is not less than the threshold value (step n6), the parameter k is updated (step n7), it is determined whether the measurement is complete or not (step n8), and the process is returned to step n2 in the case where the measurement is not complete while the process is ended by storing the last data in the case where the measurement is complete (step n9).

Figure 23:
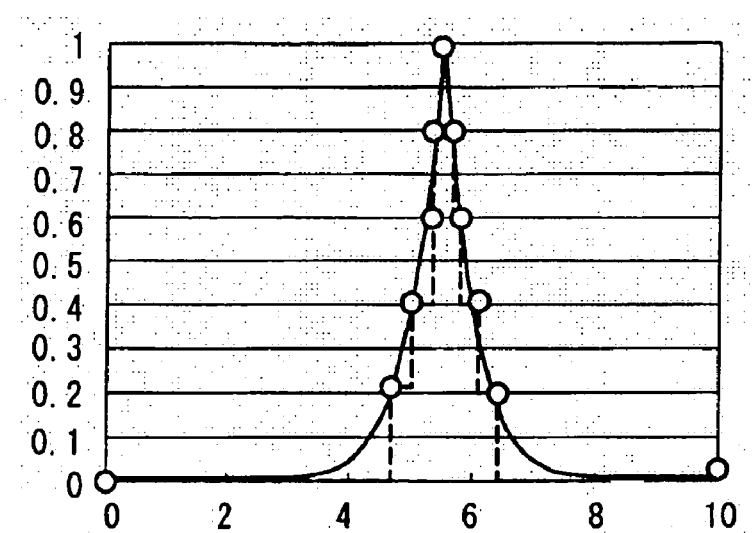
FIG. 23 is a diagram showing the data compression according to another embodiment of the invention.
Figure 24:
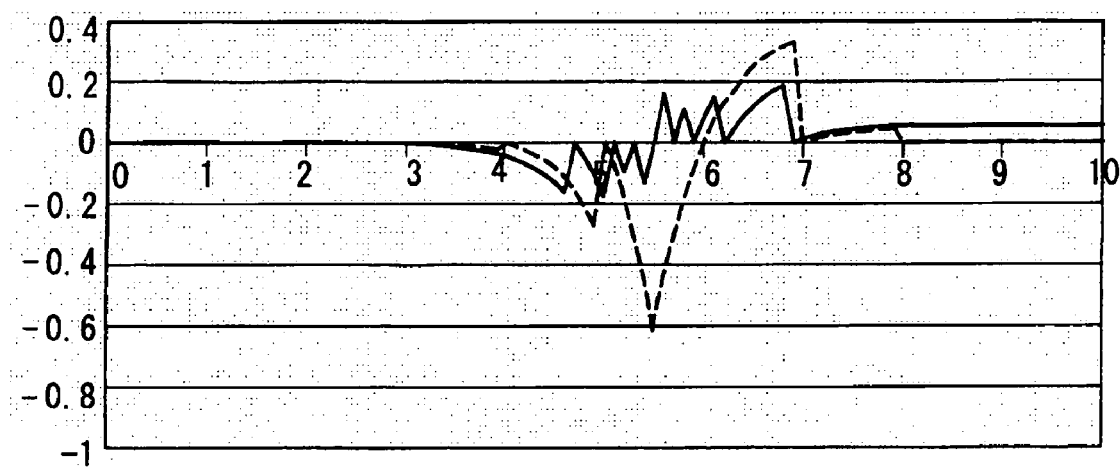
FIG. 24 is a diagram showing a comparison of the data compression between the prior art and the embodiment of FIG. 23.

Another embodiment of the invention is shown in FIG. 23, according to which the data changing by a predetermined threshold amount is held. According to this embodiment, the data is held each time of change of 0.2. In this embodiment, as shown by solid line in FIG. 24, the difference with the original signal is smaller than in the prior art shown by dashed line in FIG. 19.

Figure 25:
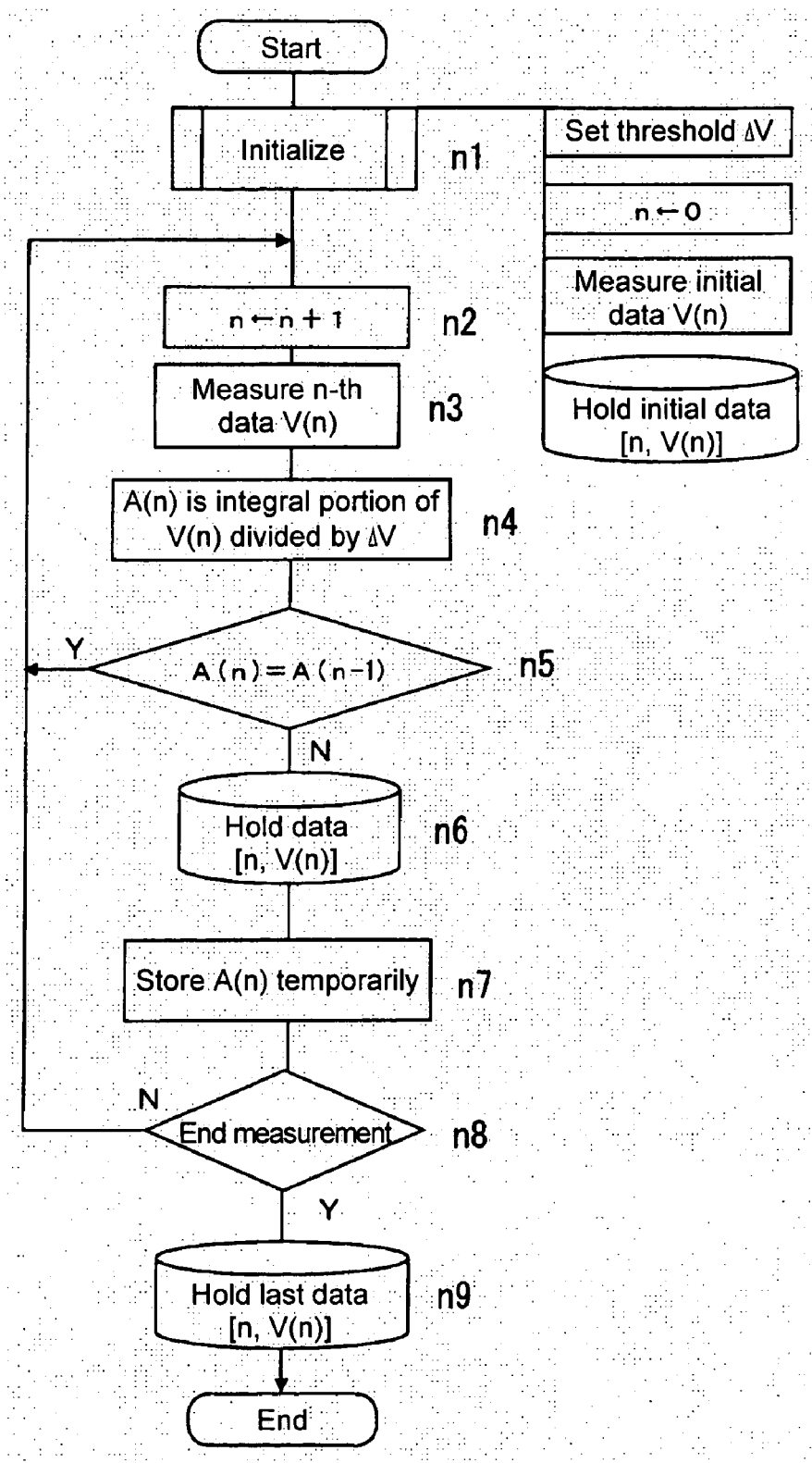
FIG. 25 is a flowchart for explaining the operation in FIG. 23.

FIG. 25 is a flowchart for explaining the data compression operation according to this embodiment.

First, the initialization process is executed (step n1). In the initialization process, the threshold value ΔV as to whether the data is held or not is set, the sampling number n is cleared, and the measurement of the initial data providing the first sampling data is held.

Next, the sampling number n is incremented (step n2), the data V(n) is measured (step n2), the integer part A(n) is calculated as a quotient by dividing the measured data V(n) by the threshold value ΔV (step n4), and it is determined whether the integer part A(n) is equal to the integer part A(n−1) of the data held in the preceding session (step n5). In the case where the integer part A(n) is equal to the integer part A(n−1) of the data held in the preceding session, the process returns to step n2, otherwise the data is held (step n6), and A(n−1) is temporarily held (step n7). It is determined whether the measurement is ended or not (step n8), and the process is returned to step n2 in the case where the measurement is not ended, while the process is ended by holding the last data in the case where the measurement is ended (step n9).

Figure 26:
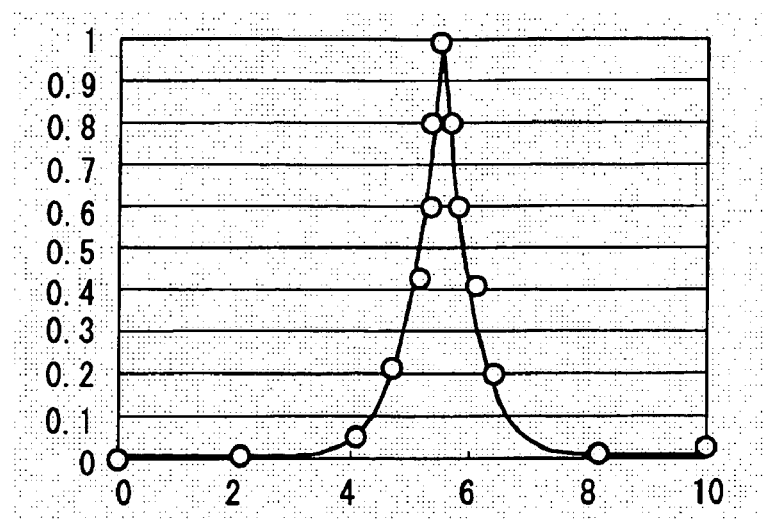
FIG. 26 is a diagram showing the data compression according to still another embodiment of the invention.
Figure 27:
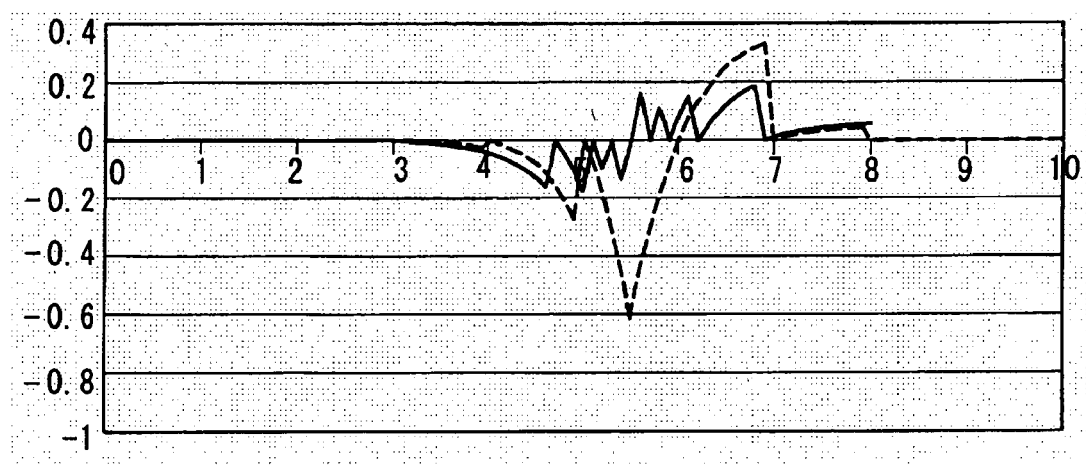
FIG. 27 is a diagram showing a comparison of data compression between the prior art and the embodiment of FIG. 26.

According to still another embodiment of the invention, as shown in FIG. 26, upon the lapse of a predetermined length of time or in the case where the data is changed by a predetermined threshold value, the data may be held. In FIG. 26, the data is changed each time of lapse of 2 or the data changed of 0.2. According to this embodiment, as indicated by solid line in FIG. 27, the difference with the original signal is smaller than in the prior art shown by dashed line in 19.

The above-mentioned data compression method is applicable not only to the instrumentation and control information providing method of this embodiment but also to other cases of data measurement.

The account of the various services can be settled by bank transfer, credit card or other appropriate methods.

In the programmed automatic processing of the instrumentation and control information providing server 2 described above, the customer demand may not be sufficiently met. In such a case, the person in charge of the service provider handles the situation by direct dialog using the chat or the internet telephone, and inputs the required information to the instrumentation and control information providing server 2, thereby more appropriately correcting the information provided to the customer.

Unlike in the embodiments described above in which the personal computer 3 and the temperature controller 4 are connected to each other, the present invention may be embodied in another way by the interposition of PLC between the personal computer 3 and a control device such as the temperature controller 4, or the use of PLC in place of the personal computer 3.

Second Embodiment

Figure 28:
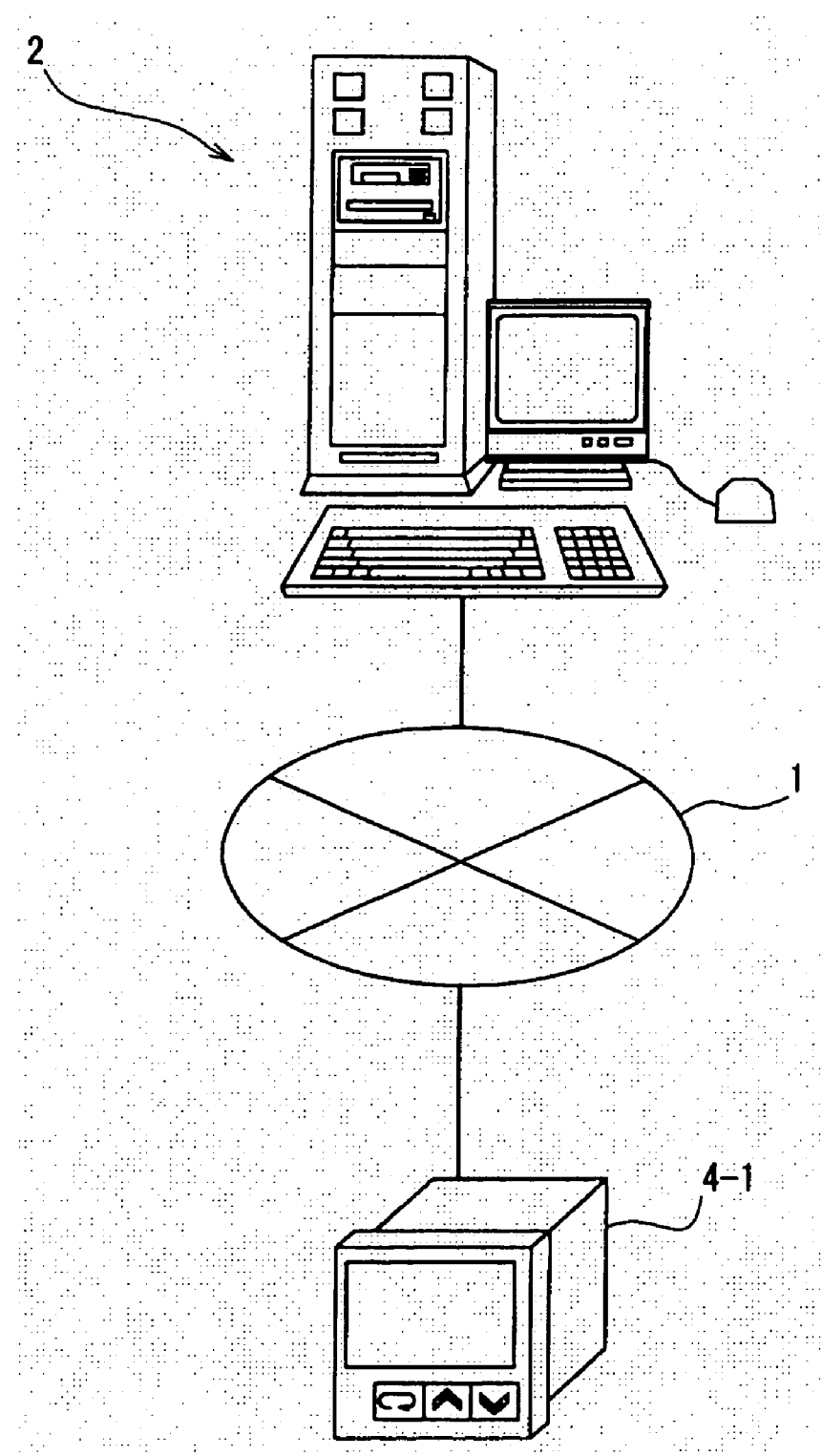
FIG. 28 shows a configuration of the instrumentation and control information providing system according to another embodiment of the invention.

FIG. 28 is a diagram showing a configuration of an instrumentation and control information providing system according to another embodiment of the invention. The same component parts as the corresponding parts in FIG. 1 are denoted by the same reference numerals, respectively.

According to this embodiment, the home page of the service provider is accessed by the temperature controller 4-1 without the intermediary of the personal computer as in the embodiments described above. In this way, an application is submitted for the service, while at the same time transmitting the instrumentation and control data such as the operation amount and the control amount directly from the temperature controller 4-1. In other words, the temperature controller 4-1 has the dual function of connecting to the internet and browsing WWW.

Figure 29:
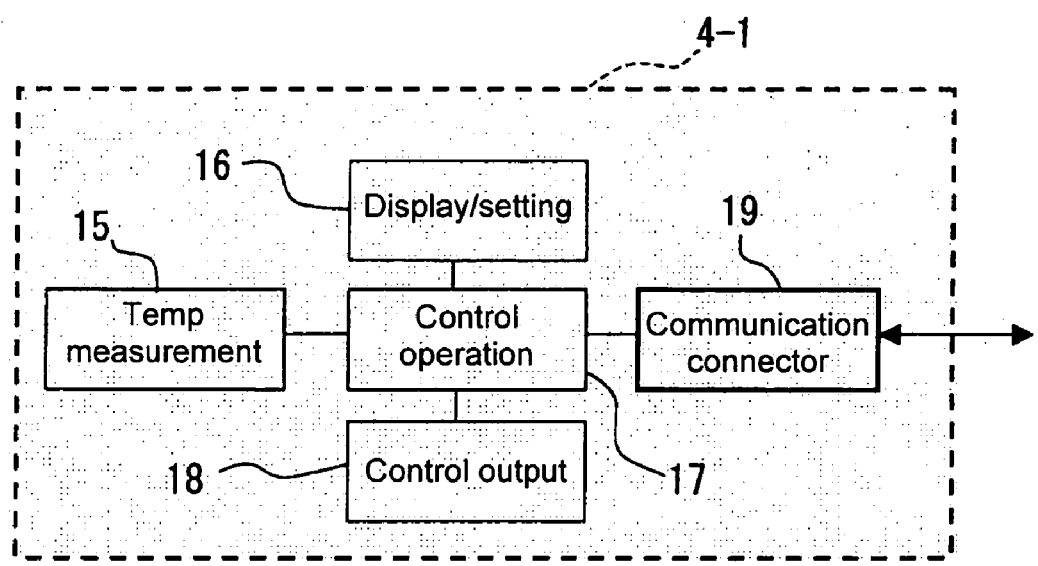
FIG. 29 is a block diagram of the temperature controller shown in FIG. 28.

FIG. 29 is a block diagram of the temperature controller 4-1 according to this embodiment. This temperature controller 4-1 includes a temperature measurement unit 15 supplied with an input from a temperature sensor for measuring the temperature of an object of control, an indication/setting unit 16 for indicating the measurement temperature and setting various values, a control operation unit 17 for calculating and controlling the operation amount, a control output unit 18 for applying a control output to an electromagnetic switch or the like, and a communication connection unit 19 for carrying out communication with the instrumentation and control information providing server 2 through the internet 1. The indication/setting unit 16 and the control operation unit 17 have the function as a service application means.

The other parts of the configuration are similar to those of the first embodiment.

Other Embodiments

In the embodiments described above, the instrumentation and control information providing server accumulates the instrumentation and control data such as the operation amount and the control amount, and executes the processing in accordance with the required service. As still another embodiment of the invention, the instrumentation and control data transmitted from the client are received and the process may be executed on line in accordance with the contents of the service. For example, a fault diagnosis is carried out on line and in the case where the diagnosis shows that a fault exists, the client may be informed immediately.

In the tuning service, the most appropriate PID gain may be provided using a plurality of methods including the Ziegler-Nichgols method and the Kitamori method as well as the CHR method.

It will thus be understood from the foregoing description that according to this invention, the client representing the customer receiving the service applies for a service and transmits the instrumentation and control data obtained by instrumentation and control to the server representing the service provider. The server, upon receipt of the instrumentation and control data, processes the instrumentation and control data in accordance with the contents of the service application received, and provides the processed information to the client. Therefore, the customer can receive the information corresponding to the service applied for without the need of accumulating or analyzing the instrumentation and control data.

What is claimed is:

1. An instrumentation and control information providing method for providing information related to instrumentation and control, comprising:

an application step for a client to submit a service application to a server;

a transmission step for said client to transmit to the server through a network the instrumentation and control data obtained by measuring and controlling an object of instrumentation and control by an instrumentation and control equipment;

an application receiving step for said server to receive a service application from said client;

a data accumulation step for said server to receive and accumulate said instrumentation and control data;

a processing step for said server to process the accumulated instrumentation and control data in accordance with the received service application; and a providing step for said server to provide information processed in said processing step as said information related to instrumentation and control to said client through said network, wherein said instrumentation and control equipment is a temperature controller, and said instrumentation and control data include at least data on an output value and an input value, and wherein the services provided by said server include a data accumulation service for accumulating said instrumentation and control data and providing the accumulated data in compliance with a request, a tuning service for providing a control parameter of said temperature controller, a modeling service for modeling an object of instrumentation and control and providing a model, and a diagnosis service for checking for a temperature control fault of said temperature controller, wherein said processing step processes one of said data accumulation service, said tuning service, said modeling service and said diagnosis service in accordance with the contents of said service application, wherein a process of reading the corresponding data from the accumulated data in compliance with the service application is executed as said data accumulation service, a process of calculating the control parameter using a model of the object of instrumentation and control based on said accumulated data of the output value and the input value is executed as said tuning service, a process of modeling said object of instrumentation and control based on said accumulated data of the output value and the input value is executed as said modeling service, and a process of checking for a fault based on said data of the output value and the input value accumulated for a normal period and a diagnosis period is executed as said diagnosis service, said tuning service includes a process of modeling said object of instrumentation and control based on said data on the input and output values to determine a model structure and calculating as said processed information a PID gain of said temperature controller using said model structure based on said accumulated data and a process of simulating a PID control of said determined model structure using said calculated PHD gain based on said data on the input and output values to produce a simulation output waveform, and providing thus produced output waveform as said processed information preceding a completion of said tuning service; said modeling service includes a process of modeling said object of instrumentation and control based on said data on the input and output values to determine a model structure as said processed information and a process of simulating an output waveform of said determined model structure based on said accumulated instrumentation and control data to produce a simulation output waveform and a difference between said simulation output waveform and an actual output waveform based on said accumulated instrumentation and control data, and providing thus produced simulation and difference output waveforms as said processed information preceding a completion of said modeling service; and said diagnosis service includes a process of modeling said object of instrumentation and control based on said data on the input and output values to determine a model structure and checking for a fault using said model structure based on said data on the input and output values for the normal period and the diagnosis period to generate a diagnosis result as said processed information and a process of simulating an output waveform of said determined model structure based on said accumulated instrumentation and control data to produce an outline of said diagnosis result, and providing thus produced outline of said diagnosis result as said processed information preceding a completion of said diagnosis service.

2. The instrumentation and control information providing method according to claim 1, wherein at least one of the steps executed by at least one of said server and said client includes a step of urging one of the service providing party and the service receiving party to input the required information, and said at least one of the steps is executed based on said input required information.

3. The instrumentation and control information providing method according to claim 2, wherein said processing step includes a step for said server to urge the service providing party to input said required information, and said server executes the process in accordance with the received service application by adding said input required information.

4. The instrumentation and control information providing method according to claim 1, wherein said instrumentation and control data transmitted from said client to said server in said transmission step is compressed data obtained by sampling instrumentation and control data obtained from said object of instrumentation and control with a change of or beyond a predetermined threshold value.

5. An instrumentation and control information providing system comprising a server connected to a network for providing a service related to the instrumentation and control, and a client connected to said network, wherein said client has communication means for transmitting to said server through said network instrumentation and control data obtained by measuring and controlling an object of instrumentation and control by an instrumentation and control equipment and receiving the information provided by said server through said network, and application means for submitting a service application by browsing the contents of said service, and wherein said server has data accumulation means for accumulating said instrumentation and control data, application receiving means for receiving a service application from said client, processing means for reading the instrumentation and control data accumulated in said data accumulation means and executing the process corresponding to the received service application, and communication means for receiving said instrumentation and control data from said client through said network and transmitting the information processed in said processing means to said client through said network, wherein said instrumentation and control equipment is a temperature controller, and said instrumentation and control data include at least the data of the output value and the input value, and wherein the services provided by said server include a data accumulation service for accumulating said instrumentation and control data and providing the accumulated data in compliance with a request, a tuning service for providing the control parameter of said temperature controller, a modeling service for modeling an object of instrumentation and control and providing a model, and a diagnosis service for checking for a temperature control fault of said temperature controller, wherein said server executes a process corresponding to the contents of at least one of said data accumulation service, said tuning service, said modeling service and said diagnosis service in accordance with the contents of said service application, wherein a process of reading the corresponding data from the accumulated data in compliance with the request of said client is executed as said data accumulation service, the process of calculating the control parameter using a model of the object of instrumentation and control based on said accumulated data of the output value and the input value is executed as said tuning service, a process of modeling said object of instrumentation and control based on said accumulated data of the output value and the input value is executed as said modeling service, and a process of checking for a fault based on said data of the output value and the input value accumulated for a normal period and a diagnosis period is executed as said diagnosis service, said processing means is further adapted as said tuning service to process modeling of said object of instrumentation and control based on said data on the input and output values to determine a model structure and calculating as said processed information a PID gain of said temperature controller using said model structure based on said accumulated data and to process simulating a PID control of said determined model structure using said calculated PID gain based on said data on the input and output values to produce a simulation output waveform, and to provide thus produced output waveform as said processed information preceding a completion of said tuning service; as said modeling service to process modeling of said object of instrumentation and control based on said data on the input and output values to determine a model structure as said processed information, and to process simulating an output waveform of said determined model structure based on said accumulated instrumentation and control data to produce a simulation output waveform and a difference between said simulation output waveform and an actual output waveform based on said accumulated instrumentation and control data, and to provide thus produced simulation and difference output waveforms as said processed information preceding a completion of said modeling service; and as said diagnosis service to process modeling of said object of instrumentation and control based on said data on the input and output values to determine a model structure and checking for a fault using said model structure based on said data on the input and output values for the normal period and the diagnosis period to generate a diagnosis result as said processed information, and to process simulating an output waveform of said determined model structure based on said accumulated instrumentation and control data to produce an outline of said diagnosis result, and to provide thus produced outline of said diagnosis result as said processed information preceding a completion of said diagnosis service.

6. The instrumentation and control information providing system according to claim 5, wherein said server urges the service providing party to input the required information, and based on the input required information, executes the process corresponding to the contents of at least one of said data accumulation service, said tuning service, said modeling service and said diagnosis service.

* * * * *